United States Patent
Omata et al.

(10) Patent No.: US 12,040,733 B2
(45) Date of Patent: Jul. 16, 2024

(54) ENCODER, DRIVING APPARATUS, ROBOT APPARATUS, CONTROL SYSTEM, AND ITS CONTROL METHOD

(71) Applicant: NIKON CORPORATION, Tokyo (JP)

(72) Inventors: Kenji Omata, Utsunomiya (JP); Koichi Sakata, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 322 days.

(21) Appl. No.: 17/211,098

(22) Filed: Mar. 24, 2021

(65) Prior Publication Data

US 2021/0297018 A1     Sep. 23, 2021

Related U.S. Application Data

(63) Continuation of application No. PCT/JP2019/033592, filed on Aug. 27, 2019.

(30) Foreign Application Priority Data

Sep. 24, 2018   (JP) .................. 2018-178181

(51) Int. Cl.
*G05B 1/00*    (2006.01)
*B25J 9/12*    (2006.01)
(Continued)

(52) U.S. Cl.
CPC ............ *H02P 6/16* (2013.01); *B25J 9/126* (2013.01); *B25J 13/088* (2013.01); *B25J 19/021* (2013.01);
(Continued)

(58) Field of Classification Search
CPC ............ H02P 6/16; B25J 9/126; B25J 13/088
See application file for complete search history.

(56) References Cited

U.S. PATENT DOCUMENTS 6,462,442 B1 * 10/2002 Braun ................ G01D 5/34738
                                                            310/68 B
9,477,221 B1 * 10/2016 Rencs ..................... G05B 21/02
(Continued)

FOREIGN PATENT DOCUMENTS

CN      101387504 A      3/2009
CN      102649270 A      8/2012
(Continued)

OTHER PUBLICATIONS

Oct. 15, 2019 Written Opinion issued in International Patent Applicaiton No. PCT/JP2019/033592.
(Continued)

*Primary Examiner* — Cortez M Cook
(74) *Attorney, Agent, or Firm* — Oliff PLC

(57) ABSTRACT

Provided is an encoder, which is provided in a driving apparatus comprising a motor section configured to drive a first displacement section, which is connected to a fixed section via an elastic body, and a transmission section configured to convert a displacement of the first displacement section and transmit the displacement to the second displacement section, comprising: a first detector configured to detect first displacement information of the first displacement section; a second detector configured to detect second displacement information of the second displacement section; a third detector configured to detect third displacement information of the motor section relative to the fixed section; and a computing section configured to obtain information related to a driving amount of the motor section using the first displacement information and the second displacement information, and obtain information of a load on the motor section using the third displacement information.

28 Claims, 12 Drawing Sheets

(51) Int. Cl.
　　*B25J 13/08* (2006.01)
　　*B25J 19/02* (2006.01)
　　*G01D 5/24* (2006.01)
　　*G01D 5/26* (2006.01)
　　*H02P 6/16* (2016.01)

(52) U.S. Cl.
　　CPC .............. *B25J 19/027* (2013.01); *G01D 5/24* (2013.01); *G01D 5/26* (2013.01)

(56) References Cited

U.S. PATENT DOCUMENTS

| | | | |
|---|---|---|---|
| 2004/0056748 A1* | 3/2004 | Masaki | B62D 6/10 336/119 |
| 2012/0239198 A1 | 9/2012 | Orita et al. | |
| 2014/0176037 A1* | 6/2014 | Yoshimuta | G05B 1/03 318/632 |
| 2015/0022130 A1* | 1/2015 | Yoshimuta | H02P 6/28 318/400.15 |
| 2015/0316428 A1 | 11/2015 | Urata | |
| 2016/0072366 A1* | 3/2016 | Omata | H02K 7/116 310/68 B |
| 2017/0136629 A1 | 5/2017 | Nagata | |

FOREIGN PATENT DOCUMENTS

| | | |
|---|---|---|
| CN | 104968967 A | 10/2015 |
| CN | 108496061 A | 9/2018 |
| JP | 2003-166887 A | 6/2003 |
| JP | 2010-269412 A | 12/2010 |
| JP | 2010-286452 A | 12/2010 |
| JP | 2011-066955 A | 3/2011 |
| JP | 5214578 B2 | 6/2013 |
| JP | 2015-194462 A | 11/2015 |
| JP | 6053424 B2 | 12/2016 |
| JP | 6291421 B2 | 3/2018 |
| JP | 2022-073859 A | 5/2022 |
| WO | 2016/031955 A1 | 3/2016 |
| WO | 2017/188114 A2 | 11/2017 |

OTHER PUBLICATIONS

Oct. 15, 2019 International Search Report issued in International Patent Applicaiton No. PCT/JP2019/033592.
Nov. 17, 2022 Office Action issued in Japanese Patent Application No. 2022-120595.
Mar. 10, 2023 Office Action issued in Chinese Patent Application No. 201980061537.X.
Sep. 28, 2022 Office Action issued in Japanese Patent Application No. 2022-120595.
Mar. 27, 2024 Office Action issued in Chinese Patent Application No. 201980061537.X.

\* cited by examiner (A)

(B)

ENCODER, DRIVING APPARATUS, ROBOT APPARATUS, CONTROL SYSTEM, AND ITS CONTROL METHOD

The contents of the following Japanese patent application are incorporated herein by reference:
NO. 2018-178181 filed in JP on Sep. 24, 2018, and
NO. PCT/JP2019/033592 filed in WO on Aug. 27, 2019.

BACKGROUND

1. Technical Field

The present invention relates to an encoder, a driving apparatus with the encoder, a robot apparatus with a driving apparatus, a control system with the encoder and a control method of the driving apparatus.

2. Related Art

In order to control the rotation angle of a motor used in the drive section of an industrial robot or a working machine or the like with high accuracy, an encoder (for example, a rotary encoder) is mounted onto the rotation shaft of the motor, and the motor is controlled based on the detection result of the encoder and other factors. Also, in order to monitor the state of the motor during assembly and adjustment, during operations and so on of the motor, it is preferable to use a torque detection apparatus to detect the torque of the load on the motor. As a conventional torque detection apparatus, an apparatus that connects the rotation shaft and output shaft of the motor with a coil spring, detects information of the rotation angles of the rotation shaft and output shaft of the motor, and acquires the torque of the motor from the information of the two rotation angles is known (refer to, for example, Patent Document 1).

Conventional torque detection apparatuses are large in scale due to the use of two rotation angle detection sections, and the detection accuracy may be affected by variations in the rotation angle of the output shaft and friction or the like caused by grease on the output shaft. Recently, for example, a motor with an encoder mounted thereon is used in more various applications and requires highly accurate control. And consideration must be given to detecting the load of the motor with high accuracy in a simple configuration.

PRIOR ART DOCUMENT

Patent Document

Patent Document 1: Japanese Patent Application Publication No. 2003-166887

GENERAL DISCLOSURE

A first aspect of the present invention provides an encoder, which is an encoder provided in a driving apparatus comprising a motor section for driving a first displacement section, which is connected to a fixed section via an elastic body and a transmission section for converting a displacement of the first displacement section and transmitting the displacement to a second displacement section, comprising: a first detector for detecting first displacement information of the first displacement section; a second detector for detecting second displacement information of the second displacement section; a third detector for detecting third displacement information of the motor section relative to the fixed section; and a computing section for obtaining information related to a driving amount of the motor section using the first displacement information and the second displacement information and obtaining information of a load on the motor section using the third displacement information.

A second aspect provides a driving apparatus, comprising: a motor section for driving a first displacement section; an elastic body for connecting the motor section in a displaceable manner to a fixed section with the motor section fixed thereto; a transmission section for converting a displacement of the first displacement section and driving a second displacement section; a first detector for detecting first displacement information of the first displacement section; a second detector for detecting second displacement information of the second displacement section; a third detector for detecting third displacement information of the motor section relative to the fixed section; a computing section for obtaining information related to a driving amount of the motor section using the first displacement information and the second displacement information, and obtaining information of a load on the motor section using the third displacement information; and a control section for controlling the motor section using information obtained by the computing section.

A third aspect provides a robot apparatus including the driving apparatus according to the second aspect.

A fourth aspect provides a control system, which is a control system of the driving apparatus, comprising: a first detector for detecting first displacement information of the first displacement section; a second detector for detecting second displacement information of the second displacement section; a third detector for detecting third displacement information of the motor section relative to the fixed section; a computing section for obtaining information related to a driving amount of the motor section using the first displacement information and the second displacement information, and obtaining information of a load on the motor section using the third displacement information; and a control section for controlling the motor section using information obtained by the computing section.

A fifth aspect provides a control method, which is a control method of a driving apparatus, comprising: detecting first displacement information of the first displacement section; detecting second displacement information of the second displacement section; detecting third displacement information of the motor section relative to the fixed section; obtaining information related to a driving amount of the motor section using the first displacement information and the second displacement information, and obtaining information of a load on the motor section using the third displacement information; and controlling the motor section using information related to the driving amount and the information of the load.

DESCRIPTION OF EXEMPLARY EMBODIMENTS

Figure 1:
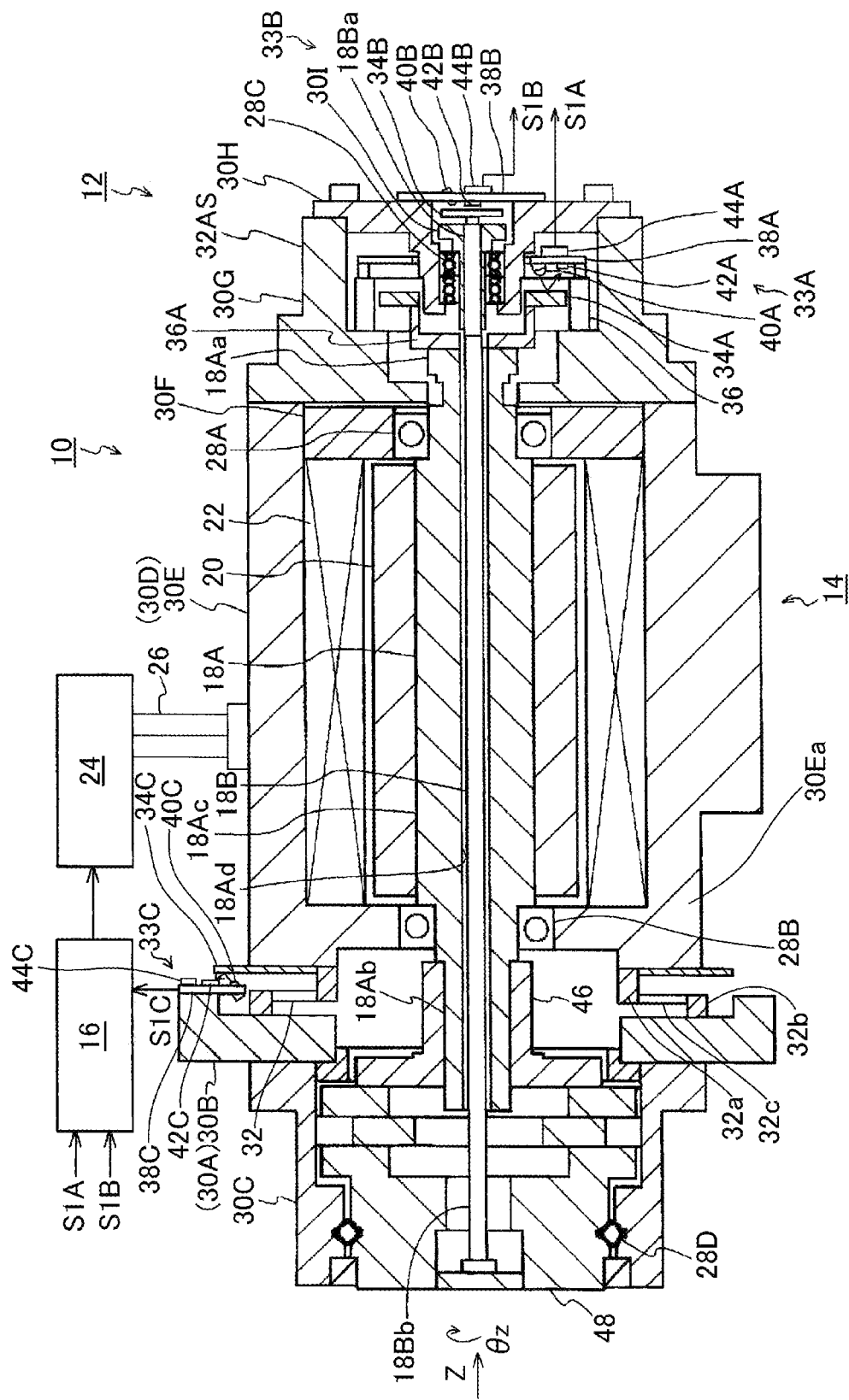
FIG. 1 illustrates a cross sectional view showing a driving apparatus according to a first embodiment of the present invention.

Hereinafter, a first embodiment is described with reference to FIG. 1 to FIG. 5. FIG. 1 illustrates a driving apparatus 10 according to the present embodiment. In FIG. 1, the driving apparatus 10 includes a base member (a fixed section) 30A fixed via a not illustrated support member (for example, an arm or the like) on a floor surface (not illustrated) of a factory where a robot apparatus is provided, for example; a motor section 14 for driving the rotation of a slender rod-shaped first rotation shaft (a first moving shaft) 18A; an elastic member (an elastic body) 32 for displaceably connecting the motor section 14 to the base member 30A; a speed reducer 48 for slowing down the rotation of the first rotation shaft 18A and conveying the deceleration to a slender rod-shaped second rotation shaft (a second moving shaft) 18B; and an encoder section 12 for detecting rotation information such as the rotation angles and the rotation speeds of the rotation shafts 18A and 18B, and a load applied onto the motor section 14 (details are described below). Further, the driving apparatus 10 includes a computing apparatus 16 for processing the detection signal of the encoder section 12, and a control apparatus 24 for driving the motor section 14 using the processing result of the computing apparatus 16.

In the present embodiment, the first rotation shaft 18A is in a hollow cylindrical shape, and the second rotation shaft 18B is arranged to pass through the interior 18Ad of the cylindrical first rotation shaft 18A. Hereinafter, the explanation is given by setting the Z axis parallel to the central axis of the first rotation shaft 18A. The central axis of the first rotation shaft 18A coincides with the central axis of the second rotation shaft 18B, and the rotation shafts 18A and 18B are respectively rotatable around the central axes (the axes parallel to the Z axis). As one example, although the motor section 14 is a three-phase AC motor, a DC motor or the like can also be used as the motor section 14.

First, the base member 30A has a ring-shaped first support member 30B, and a cylindrical second support member 30C fixed on the –Z direction side with respect to the first support member 30B. Also, the motor section 14 has a motor case 30D consisting of a cylindrical holding member 30E and a ring-shaped retaining member 30F provided to cover the side surface of the holding member 30E in the +Z direction, and the first rotation shaft 18A is rotatably supported on two opposite side portions of the motor case 30D via a pair of rotation bearings 28A and 28B. Also, the motor section 14 has a plurality of magnets 20 mounted on the outer surface of the central shaft 18Ac of the first rotation shaft 18A, and a plurality of coils 22 arranged on the inner surface of the motor case 30D to enclose the magnets 20. The coil 22 is connected to the control apparatus 24 via a plurality of signal lines 26.

Also, the side surface of the first support member 30B at the end of the base member 30A in the +Z direction and the side surface of the end 30Ea in the –Z direction of the motor case 30D (holding member 30E) are connected by the elastic member 32. The elastic member 32 is arranged between the base member 30A (the first support member 30B) and the motor case 30D (the holding member 30E) in the direction (Z direction) along the central axis of the first and second rotation shafts 18A and 18B, contacting the first support member 30B and the holding member 30E.

As shown in FIG. 2(A), the elastic member 32 has an inner orbicular section (for example, a first element) 32a fixed on the end 30Ea, an outer orbicular section (for example, a second element) 32b fixed on the first support member 30B, a plurality of (for example, three, four, five and so on) sheet spring sections (for example, a third element) 32c for connecting the orbicular sections 32a and 32b in the radial direction. The center of the orbicular sections 32a and 32b coincides with the central axis of the rotation shafts 18A and 18B, and the sheet spring section 32c is elastically deformable in a predetermined range around the central axis. The elastic member 32 is also a so-called flexure. Therefore, the elastic member 32 allows the motor section 14 including the motor case 30D to rotate with respect to the base member 30A in the +θz or –θz direction within a predetermined range around its central axis (for example, the axis coinciding with the central axis of the rotation shafts 18A and 18B) or in the rotational direction around the axis parallel to the Z axis (hereinafter referred to as the θz direction). Also, the elastic member 32 can reduce the range of the relative rotation angle in the θz direction of the motor section 14 relative to the base member 30A by increasing the rigidity of its sheet spring section 32C.

Also, returning to FIG. 1, a speed reducer 48 (speed conversion section or transmission section) is arranged inside the second support member 30C of the base member 30A via a rotation bearing 28D. The input shaft 46 of the speed reducer 48 is connected to the end 18Ab in the –Z direction of the first rotation shaft 18A, and the output shaft of the speed reducer 48 is connected to the end 18Bb in the –Z direction of the second rotation shaft 18B. The speed reducer 48 reduces the number of rotations of the first rotation shaft 18A to, for example, approximately 1/300 and transmits it to the second rotation shaft 18B. A driven section (not illustrated) is connected to the surface in the –Z direction of the speed reducer 48 (the end in the –Z direction of the second rotation shaft 18B). In the present embodiment, the elastic member 32 is arranged in the vicinity of the speed reducer 48.

A cylindrical support member (a encoder case, main body of the encoder) 30G having a difference in level is fixed to the side surface in the +Z direction of the motor case 30D, and the end 18Ba in the +Z direction of the second rotation shaft 18B is supported via the rotation bearing 28C and the fixing member (shaft fixing section) 301 on the inner surface of the mounted member 30H fixed to the surface in the +Z direction of the support member 30G. The substrate 38A is held on the inner surface of the support member 30G via the support member 36, the substrate 38B is mounted on the surface in the +Z direction of the mounted member 30H, and the substrate 38C is mounted on the surface in the +Z direction of the first support member 30B.

Further, the first and second rotation plates 34A and 34B, which are orbicular and disc-shaped, with a reflective type pattern (not illustrated; hereinafter referred to as a rotational type detection pattern) formed for detecting the position in the rotational direction are mounted on the support member 36A at the tip of the end 18Aa in the +Z direction of the first rotation shaft 18A and on the end 18Ba of the second rotation shaft 18B, respectively. In addition, an orbicular third rotation plate 34C with a rotational type detection pattern formed reflectively on the surface in the −Z direction (the region outside the inner orbicular section 32a of the elastic member 32) of the end 30Ea in the −Z direction (the connecting portion of the motor section) of the motor case 30D is mounted.

The encoder section 12 includes a first detection section 33A, a second detection section 33B and a third detection section 33C. The first detection section (the sensor for position detection) 33A has a first rotation plate 34A, a light source 40A that irradiates detection light to a pattern on the first rotation plate 34A, a light receiving element 42A that receives light (for example, reflected light) from the pattern, and a processing circuit 44A that processes the detection signal of the light receiving element 42A to obtain the position information of the rotation plate 34A (and the first rotation shaft 18A) in the θz direction (displacement information including angle, angular velocity, and/or multi rotation information indicating how many times the first rotation shaft 18A has rotated) (hereinafter referred to as encoder information) S1A with respect to the motor section 14. The light source 40A, the light receiving element 42A and the processing circuit 44A are mounted on the substrate 38A. Also, the second detection section (the sensor for position detection) 33B has a second rotation plate 34B, a light source 40B that irradiates detection light to a pattern on the second rotation plate 34B, a light receiving element 42B that receives light (for example, reflected light) from the pattern, and a processing circuit 44B that processes the detection signal of the light receiving element 42B to obtain the encoder information S1B of the rotation plate 34B (and the second rotation shaft 18B) in the θz direction with respect to the motor section 14. The light source 40B, the light receiving element 42B and the processing circuit 44B are mounted on the substrate 38B.

The third detection section 33C has a third rotation plate 34C, a light source 40C that irradiates detection light to a pattern on the third rotation plate 34C, a light receiving element 42C that receives light (for example, reflected light) from the pattern, and a processing circuit 44C that processes the detection signal of the light receiving element 42C to obtain the encoder information S1C of the rotation plate 34C (and the motor section 14) in the θz direction with respect to the base member 30A. The light source 40C, the light receiving element 42C and the processing circuit 44C are mounted on the substrate 38C. The first support member 30B (the connecting portion of the fixed section) has a substrate 38C mounted on the surface in the +Z direction. In other words, the third detection section 33C is structurally configured separately (and arranged in a separate position) with respect to the first detection section 33A and the second detection section 33B, and is arranged in the first support member 30B (the connecting portion connected with the elastic member 32 of the base member 30A) and the end 30Ea in the −Z direction of the motor case 30D (the connecting portion connected with the elastic member 32 of the motor section 14). Each of the detection sections 33A to 33C of the present embodiment is also a rotary encoder. The encoder information S1A, SIB, S1C is supplied to the computing apparatus 16. The rotation plates 34A to 34C can also be referred to as rotational type scales or discs. Note that the detection pattern formed on the rotation plates 34A to 34C may be any pattern, such as the absolute type or the incremental type. The rotation plates 34A to 34C are of the reflective type, but the rotation plates 34A to 34C may also have a transparent type pattern formed thereon.

The computing apparatus 16 supplies the information of the driving amount of the motor section 14 generated using the encoder information S1A, S1B, S1C to the control apparatus 24, and the control apparatus 24 controls the current value supplied to the coil 22 accordingly. With this operation, the rotation angle or the like of the second rotation shaft 18B is controlled to be a target value. Then, the configurations of the computing apparatus 16 and the control apparatus 24 of the driving apparatus 10 of the present embodiment are described. FIG. 2(B) illustrates a dynamical model of the driving apparatus 10 in FIG. 1. In FIG. 2(B), the holding member 30E of the motor section 14 is connected to the base member 30A via the elastic member 32, the speed reducer 48 is connected to the motor section 14 via the first rotation shaft 18A, and the driven section 50 is connected to the speed reducer 48 via the second rotation shaft 18B. Herein, the rigidity of the elastic member 32 is $K_B$, the viscosity proportionality coefficient is $C_B$, the moment of the motor section 14 is $J_M$, the viscosity proportionality coefficient is $C_M$, the rigidity of the speed reducer 48 is K, the viscosity proportionality coefficient is C, the speed reduction ratio is R, the moment of the driven section 50 is $J_L$, the overall moment of the driving apparatus 10 is $J_{all}$, the torque functioning from the motor section 14 to the speed reducer 48 via the first rotation shaft 18A is $\tau_M$, and the torque functioning from the speed reducer 48 to the driven section 50 via the second rotation shaft 18B is $\tau_L$. In the present embodiment, the torque τL is a load functioning to the motor section 14. Since this load (torque $\tau_L$) is fluctuating as a function of time, it will affect the rotational accuracy of the motor section 14 (error in the rotation angle of the driven section 50 from the target value) unless some compensation is provided. Therefore, the load is detected using the detection result of the third detection section (sensor for load detection) 33B as described below.

In other words, the third detection section 33C measures the rotation angle θB of the motor section 14 relative to the base member 30A (base member 30A which is the reference position for the detection of the third detection section 33C), the first detection section 33A measures the rotation angle θM of the first rotation shaft 18A relative to the motor section 14 (or the holding member 30E) (the motor section 14 or the holding member 30E that is the reference position for the detection of the first detection section 33A), and the second detection section 33B measures the rotation angle θL of the second rotation shaft 18B relative to the motor section 14 (or the holding member 30E) (the motor section 14 or the holding member 30E that is the reference position for detection of the first detection section 33A). The rotation angles θB, θM and θL are included in the above-mentioned encoder information S1A, SIB, SIC. Note that the second detection section 33B may detect the rotation angle of the second rotation shaft 18B relative to the speed reducer 48, and use this rotation angle instead of the rotation angle θL.

Figure 2:
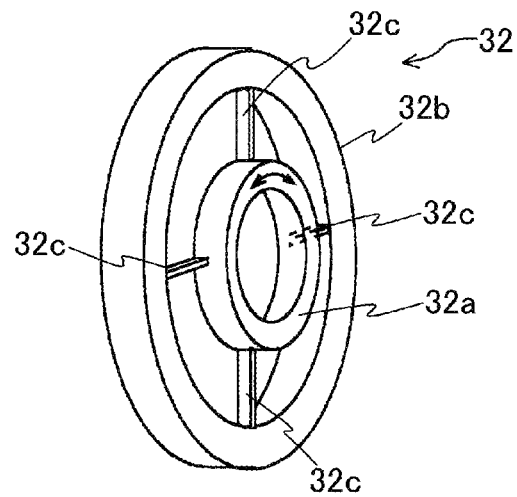
FIG. 2 illustrates (A) a perspective view showing an elastic member in FIG. 1, and (B) a dynamical model of the driving apparatus in FIG. 1.
Figure 2:
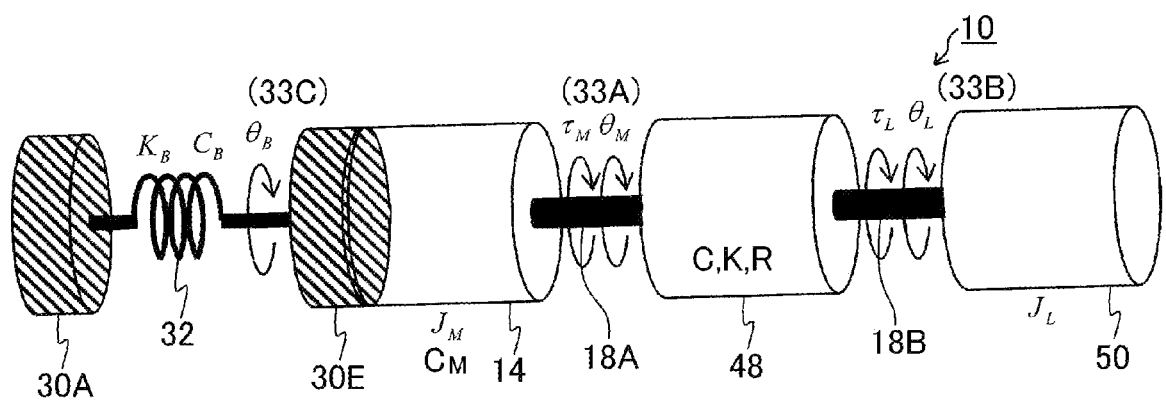
Figure 3:
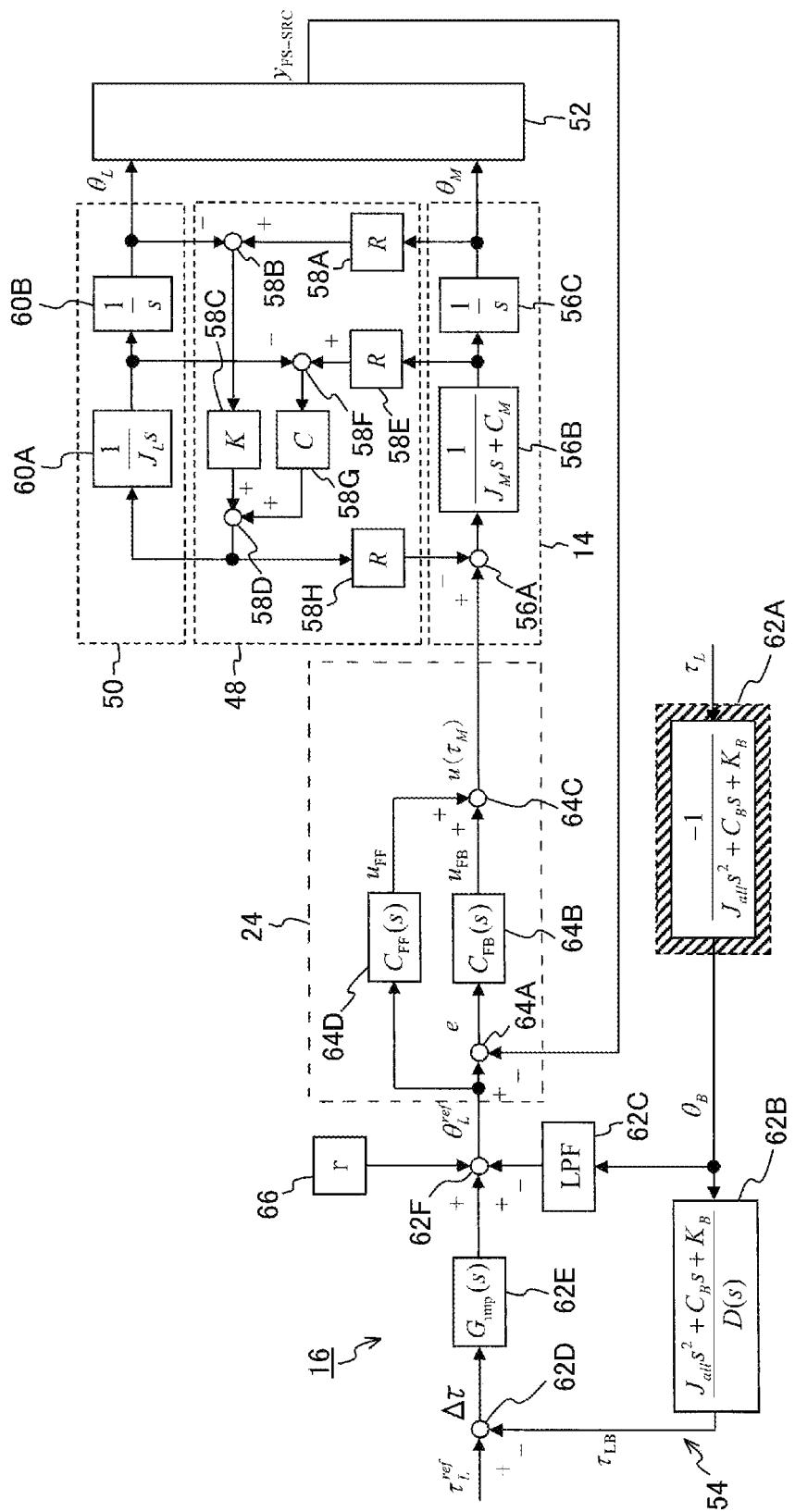
FIG. 3 illustrates a block diagram showing a driving apparatus in FIG. 1.

Further, FIG. 3 illustrates a block diagram showing the driving apparatus 10 in FIG. 1 corresponding to the dynamical model in FIG. 2(B). FIG. 3 also illustrates an example of a control circuit for obtaining information of the load applied to the motor section 14 using the information on the rotation angles $\theta_M$, $\theta_L$, and $\theta_B$ detected by the encoder section 12, and driving the motor section 14 so that the second rotation shaft 18B (the driven section) is rotated at the target rotation angle. In FIG. 3, the variable s is the variable of the Laplace transform. If the frequency is f (Hz) and the angular frequency is ω, the variable s is s=i2πf=iω (i is an imaginary unit) in the steady state. In FIG. 3, the blocks enclosed by the dotted lines, indicated by the driven section 50, the speed reducer 48, and the motor section 14, represent the elements of the respective transfer functions.

In the motor section 14, the signal corresponding to the torque command value $\tau_M$ supplied from the control apparatus 24 is supplied to the subtraction point 56A, and the signal output from the conversion section 58H corresponding to the speed reduction ratio R of the speed reducer 48 is also supplied to the subtraction point 56A, the difference signal of those two signals obtained at the subtraction point 56A is supplied to the integration section 56C and the conversion section 58E of the speed reducer 48 via the block 56B represented by the transfer function (1/(JMs+CM)), and the output of the integration section 56C is supplied to the synthesizing section 52 of the computing apparatus 16 and the conversion section 58A of the speed reducer 48 as a signal corresponding to the rotation angle θM detected by the first detection section 33A.

Also, in the speed reducer 48, the output signal of the conversion section 58A is supplied to the subtraction point 58B, the signal corresponding to the rotation angle $\theta_L$ output from the driven section 50 (detected by the second detection section 33B) is also supplied to the subtraction point 58B, and the signal obtained by taking the difference of those two signals at the subtraction point 58B is supplied to the addition point 58D via the elastic section 58C of the rigidity K. Also, the signal output from the conversion section 58E and the signal output from the rotation section 60A described below of the driven section 50 are supplied to the subtraction point 58F, the difference signal output from the subtraction point 58F is supplied to the addition point 58D via the damper section 58G of the viscosity proportionality coefficient C, the output signal of the addition point 58D is supplied to the conversion section 58H and the driven section 50 corresponding to the speed reduction ratio R, and the output signal of the conversion section 58H is supplied to the subtraction point 56A of the motor section 14.

Figure 4:
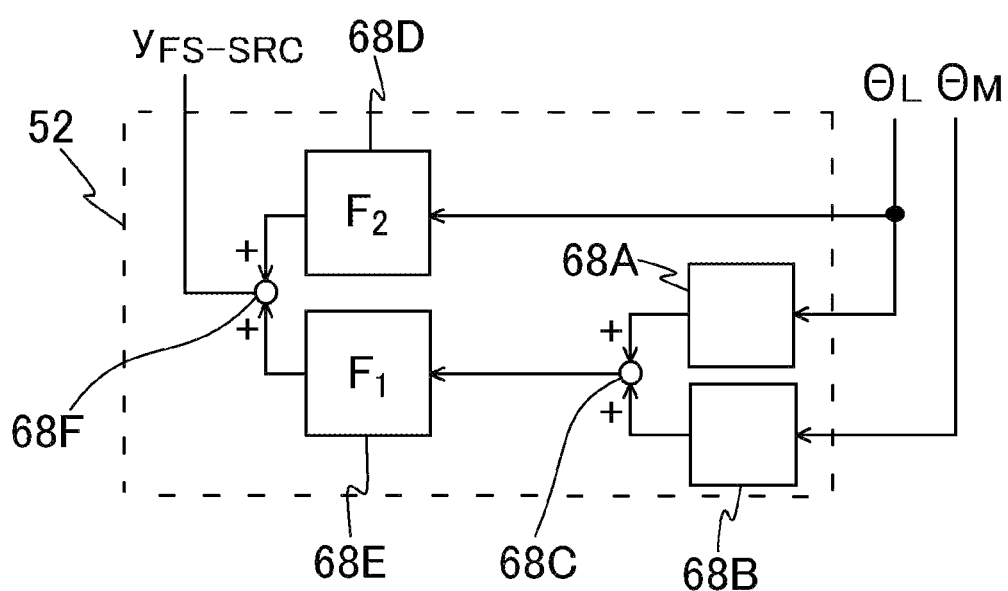
FIG. 4 illustrates a block diagram showing a synthesizing section in FIG. 3.

In the driven section 50, the signal supplied from the addition point 58D of the speed reducer 48 is supplied to the integration section 60B and the subtraction point 58F of the speed reducer 48 via the rotation section 60A by moment $J_L$, and the output of the integration section 60B is supplied to the synthesizing section 52 of the computing apparatus 16 and the subtraction point 58B of the speed reducer 48 as the signal corresponding to the rotation angle $\theta_L$ detected by the second detection section 33B. FIG. 4 illustrates one example of the synthesizing section 52 for obtaining the signal corresponding to the accurate rotation angle of the second rotation shaft 18B from the signal corresponding to the rotation angle $\theta_L$ and $\theta_M$. In FIG. 4, the signal corresponding to the rotation angle $\theta_L$ is supplied to the low-pass filter section 68D, which passes signals in the frequency range $F_1$ lower than the predetermined cutoff frequency, and to the multiplication section 68A with a predetermined gain a, and the signal corresponding to the rotation angle $\theta_M$ is supplied to the multiplication section 68B with a predetermined gain β. Also, the output signals of the multiplication sections 68A and 68B are added at the addition point 68C, and the added signals are supplied to the high-pass filter section 68E, which passes signals in the frequency range $F_2$ higher than the predetermined cutoff frequency, and the signal obtained by adding the output signals of the filter sections 68D and 68E at the addition point 68F (hereinafter referred to as the signal $y_{FS-SRC}$) is supplied to the control apparatus 24 in FIG. 3. By using the synthesizing section 52, the signal $y_{FS-SRC}$ (position information or information of the driving amount of the motor section 14) corresponding to the actual rotation angle (accurate rotation angle including the effect of backlash in the speed reducer 48 or the like) of the second rotation shaft 18B (the driven section 50) can be obtained from the two rotation angles $\theta_L$ and $\theta_M$ with high accuracy.

Note that as the synthesizing section 52, for example, a circuit can be used to generate a signal equivalent to a weighted average of the value of the rotation angle $\theta_M$ reduced by a known speed reduction ratio of the speed reducer 48 and the rotation angle $\theta_L$. In this case, the weight of the rotation angle $\theta_L$ may be greater than the weight of the value of the rotation angle $\theta_M$ reduced by its speed reduction ratio. Also, since the speed reducer 48 can also be regarded as an elastic member, the driving apparatus 10 (or an encoder section 12) can also use the difference of the two rotation angles $\theta_L$ and $\theta_M$ described above to obtain the torque of the load functioning to the speed reducer 48 from the driven section 50. The circuit for obtaining the torque of the load may be provided inside the computing apparatus 16.

In FIG. 3, the torque τL, which represents the load from the driven section 50 to the motor section 14, is converted into the rotation angle $\theta_B$ of the motor section 14 relative to the base member 30A by the block 62A, which virtually represents the transfer function of the elastic member 32 (−1/ ($J_{all}s^2+C_Bs+K_B$)), and this rotation angle $\theta_B$ is detected by the third detection section 33C and supplied to the computing apparatus 16. In the computing apparatus 16, the signal corresponding to the rotation angle $\theta_B$ is supplied to the torque recovery section 62B and the low-pass filter section 62C, which have the characteristics of the transfer function ($J_{all}s^2+C_Bs+K_B$/D(s)) (the function D(s) is a correction function determined based on actual measurements or the like, for example), which is substantially the reverse of the block 62A. The output signal of the low-pass filter section 62C is supplied to the subtraction point 62F, and the signal corresponding to the torque $\tau_{LB}$ recovered by the torque recovery section 62B is supplied to the subtraction point 62D. At the subtraction point 62D, the signal obtained by subtracting the signal corresponding to the recovered torque $\tau_{LB}$ from the signal corresponding to the preset reference value of torque $\tau_L^{ref}$ (the signal corresponding to the difference in torque Δτ) is supplied to the subtraction point 62F via the block with the characteristics represented by the following transfer function $G_{imp}(s)$ 62E (hereinafter referred to as the impedance section). Note that in Expression 1, the coefficient $J_{imp}$ is the moment, the coefficient $C_{imp}$ is the viscosity proportionality coefficient, and the coefficient $K_{imp}$ is the rigidity. These coefficients can be changed software-wise in the computing apparatus 16.

$$G_{imp}(s)=1/(J_{imp}s^2+C_{imp}s+K_{imp})$$ [Expression 1: Transfer function]

The impedance section 62E is used to suppress changes in the rotation angle $\theta_B$ of the motor section 14 (and thus changes in the rotation angle of the second rotation shaft 18B (the driven section 50) from the target value) in response to changes in the torque $\tau_L$ of the load. For example, when the coefficient $K_{imp}$ is set to a large value, the motor section 14 becomes stiffer in response to changes in the load torque $\tau_L$, and the change in the rotation angle $\theta_B$ becomes smaller. On the other hand, when the coefficient $K_{imp}$ is set to a small value, the motor section 14 becomes softer in response to changes in the load torque $\tau_L$, and the change in the rotation angle $\theta_B$ becomes larger. These coefficients are set to the optimum values according to the application of the driving apparatus 10 or the like.

Further, at the subtraction point 62F, the signal r corresponding to the target rotation angle of the driven section 50 output from the target rotation angle setting section 66 is added to the signal output from the impedance section 62E, and the signal obtained by subtracting the signal output from the low-pass filter section 62C from the added value (the signal corresponding to the target rotation angle $\theta_L^{ref}$ of the driven section 50) is supplied to the subtraction point 64A and feedforward section 64D of the control apparatus 24.

In the control apparatus 24, the signal $y_{FS\text{-}SRC}$ corresponding to the accurate rotation angle of the driven section 50 from the synthesizing section 52 is also supplied to the subtraction point 64A, and the signal obtained by subtracting the signal $y_{FS\text{-}SRC}$ from the signal corresponding to the target rotation angle $\theta_L^{ref}$ at the subtraction point 64A is supplied to the feedback section 64B. The transfer functions $C_{FF}(s)$ and $C_{FB}(s)$ of the feedforward section 64D and feedback section 64B are arbitrary. The signal u (the signal corresponding to the torque command value $\tau_M$) obtained by adding the output signals $u_{FF}$ and $u_{FB}$ of the feedforward section 64D and feedback section 64B at the addition point 64C is supplied to the subtraction point 56A of the motor section 14.

Figure 5:
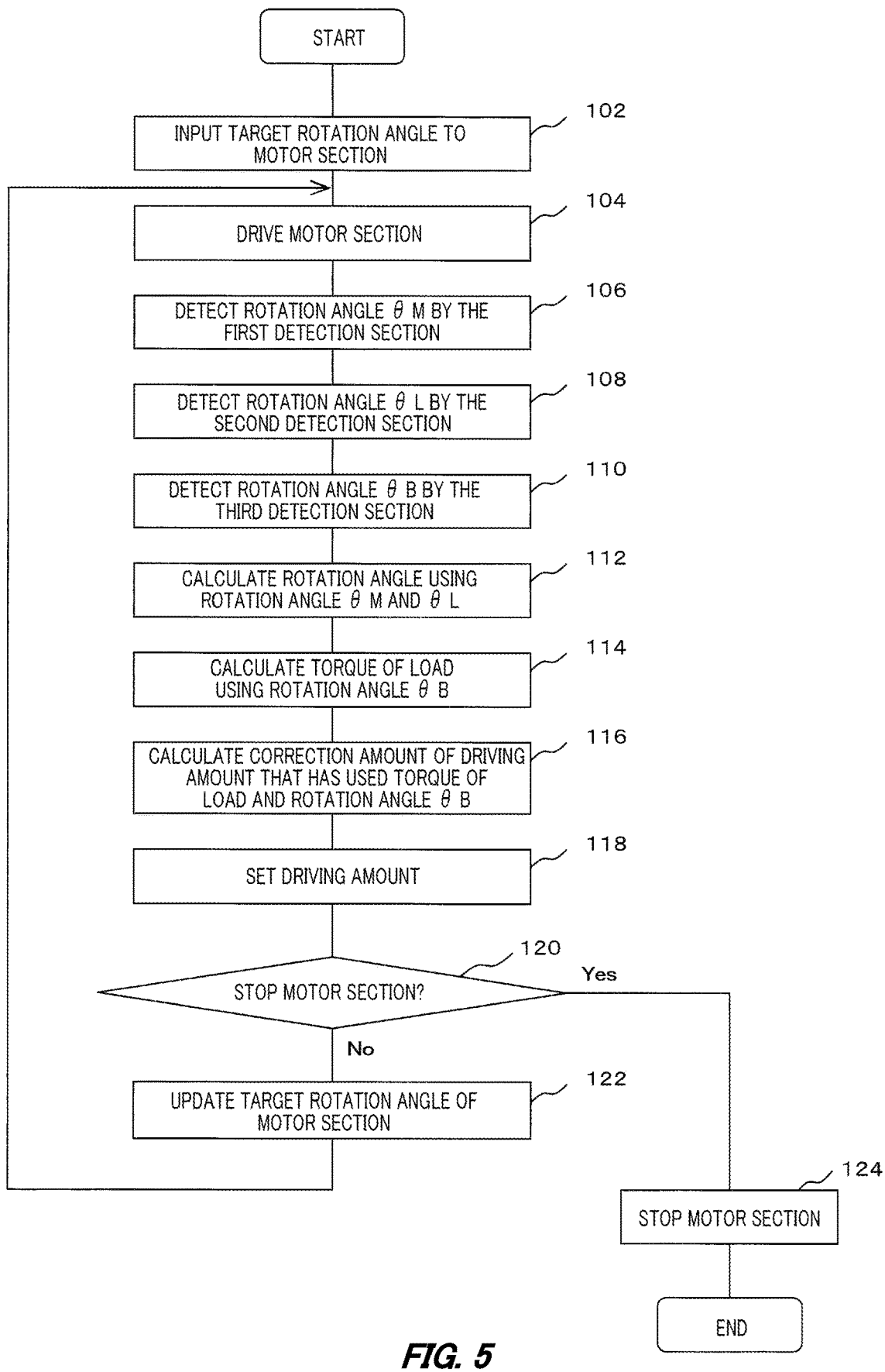
FIG. 5 illustrates a flowchart showing one example of a control method of the driving apparatus in FIG. 1.

Then, one example of the control method of the driving apparatus 10 of the present embodiment is described with reference to the flowchart in FIG. 5. First, in step 102 of FIG. 5, the target rotation angle of the driven section 50 is input to the output section in the target rotation angle setting section 66 inside the control apparatus 24. Then, in step 104, the signal r corresponding to the target rotation angle is supplied from its output section to the motor section 14 via the control apparatus 24, and the motor section 14 starts driving the first rotation shaft 18A. Also, in step 106, the first detection section 33A detects the rotation angle $\theta_M$ of the first rotation shaft 18A, in step 108, the second detection section 33B detects the rotation angle $\theta_L$ of the second rotation shaft 18B, and in step 110, the third detection section 33C detects the rotation angle $\theta_B$ of the motor section 14. Note that the operations of steps 106 to 110 are performed substantially in parallel in a predetermined cycle.

Then, in step 112, the synthesizing section 52 in the computing apparatus 16 obtains the signal $y_{FS\text{-}SRC}$ corresponding to the actual rotation angle of the driven section 50 using the rotation angles $\theta_M$ and $\theta_L$, and in step 114, the torque recovery section 62B in the computing apparatus 16 calculates (recoveries) the torque $\tau_{LB}$ of the load using the rotation angle $\theta_B$. In the next step 116, in the impedance section 62E and the subtraction point 62F, the signal corresponding to the target rotation angle $\theta_L$ ref of the driven section 50 (correction value of the driving amount of the motor section 14) is obtained using the torque $\tau_{LB}$ of the load and the rotation angle $\theta_B$. Further, in step 118, the control apparatus 24 obtains a signal (driving amount) corresponding to the torque command value $\tau_M$ of the motor section 14 using the signal r corresponding to the target rotation angle of the driven section 50, the signal $y_{FS\text{-}SRC}$ corresponding to the actual rotation angle, and the signal corresponding to the target rotation angle $\theta_L^{ref}$, and by supplying this signal to the motor section 14 (setting the driving amount), the motor section 14 drives the first rotation shaft 18A so as to suppress the change in rotation angle of the driven section 50 due to the torque $\tau_L$ of the load.

If the motor section 14 is not stopped in the next step 120, the target rotation angle is updated by the target rotation angle setting section 66 in step 122 (since the target rotation angle changes with time, new target rotation angles are set one after another with the passage of time), and the operation returns to step 104. If the motor section 14 is stopped in step 122, the operation shifts to step 124 and the motor section 14 is stopped. Thus, according to the driving apparatus 10, the torque $\tau_{LB}$ of the load is calculated using the rotation angle $\theta_B$ detected by the third detection section 33B of the encoder section 12, the signal corresponding to the target rotation angle $\theta_L^{ref}$ is obtained using the calculated torque $\tau_{LB}$, and the driving amount of the motor section 14 is corrected with this signal. Therefore, even when the torque $\tau_L$ of the load fluctuates greatly, the motor section 14 can be made to have a large output and the rotation angle of the second rotation shaft 18B (driven section 50) can be controlled to the target value with high accuracy. Also for example, during assembly and adjustment of the driving apparatus 10, the load may be applied to the second rotation shaft 18B so that the torque $\tau_{LB}$ of the calculated load is fitted within a predetermined tolerance range. This can prevent a large load from being applied to the motor section 14 during assembly and adjustment.

As described above, the encoder part 12 of the present embodiment is an encoder section provided in the driving apparatus 10, which including the motor section 14 connected to the base member 30A (the fixed section) via the elastic member 32 to drive the first rotation shaft 18A (the first displacement section), and the speed reducer 48 (the transmission section), which converts the rotation angle of the first rotation shaft 18A and transmits it to the second rotation shaft 18B (the second displacement section). And the encoder section 12 has a first detection section 33A that detects the rotation angle $\theta_M$ (the first displacement information) of the first rotation shaft 18A, a second detection section 33B that detects the rotation angle $\theta_L$ (the second displacement information) of the second rotation shaft 18B, a third detection section 33C that detects the rotation angle $\theta_B$ (the third displacement information) of the motor section 14 relative to the base member 30A, and a computing apparatus 16 that uses the rotation angles $\theta_M$ and $\theta_L$ to obtain (to obtain by calculation) the signal $y_{FS\text{-}SRC}$ (information about the driving amount of the motor section 14) corresponding to the actual rotation angle of the second rotation shaft 18B (the driven section 50), and to obtain the torque $\tau_{LB}$ of the load on the motor section 14 using the rotation angle $\theta_B$.

According to the encoder section 12, the torque $\tau_{LB}$ of the load applied to the motor section 14 from the base member 30A, that is, the load applied to the motor section 14 from the driven section 50, can be obtained using the detection signal of one third detection section 33C. Also, the third detection section 33C is provided at a position away from the speed reducer 48 and the second rotation shaft 18B (driven section 50). Therefore, even if there are variations in the rotation angle of the second rotation shaft 18B (output shaft) and friction or the like caused by grease on the second rotation shaft 18B, the load on the motor section 14 can be detected with high accuracy using a simple configuration.

Further, the driving apparatus 10 of the present embodiment includes the base member 30A, the motor section 14 for driving the first rotation shaft 18A, the elastic member 32 for connecting the motor section 14 to the base member 30A in a displaceable manner, the speed reducer 48 for converting the rotation angle of the first rotation shaft 18A to drive the second rotation shaft 18B, the first detection section 33A for detecting the rotation angle $\theta_M$ of the first rotation shaft 18A, the second detection section 33B for detecting the rotation angle $\theta_L$ of the second rotation shaft 18B, the third detection section 33C for detecting the rotation angle $\theta_B$ of the motor section 14 relative to the base member 30A, and the computing apparatus 16 for obtaining the signal $y_{FS\text{-}SRC}$ corresponding to the actual rotation angle of the second rotation shaft 18B using the rotation angle $\theta_M$ and $\theta_L$, and obtains the torque $\tau_{LB}$ of the load on the motor section 14 using the rotation angle $\theta_B$, and a control apparatus 24 that controls the motor section 14 using the information (the signal $y_{FS\text{-}SRC}$ and the torque $\tau_{LB}$ of the load) obtained by the computing apparatus 16.

Further, the control system of the present embodiment is a control system for the driving apparatus 10, including the first to third detection sections 33A, 33B, 33C for detecting the rotation angles $\theta_M$, $\theta_L$, and $\theta_B$, the computing apparatus 16 for obtaining the signal $y_{FS\text{-}SRC}$ corresponding to the actual rotation angle of the second rotation shaft 18B using the rotation angles $\theta_M$ and $\theta_L$, and for obtaining the torque $\tau_{LB}$ of the load on the motor section 14 using the rotation angle $\theta_B$, and a control apparatus 24 for controlling the motor section 14 using the information obtained by the computing apparatus 16 (the signal $y_{FS\text{-}SRC}$ and the torque $\tau_{LB}$ of the load).

Further, the control method of the present embodiment is a control method for the driving apparatus 10, including step 106 for detecting the rotation angle $\theta_M$ of the first rotation shaft 18A, step 108 for detecting the rotation angle $\theta_L$ of the second rotation shaft 18b, step 110 for detecting the rotation angle $\theta_B$ of the motor section 14, step 112 for using the rotation angles $\theta_M$ and $\theta_L$ to obtain the signal $y_{FS\text{-}SRC}$ corresponding to the actual rotation angle of the second rotation shaft 18B, step 114 for obtaining the torque $\tau_{LB}$ of the load on the motor section 14 using the rotation angle $\theta_B$, and step 118 for controlling the motor section 14 using the obtained information (the signal $y_{FS\text{-}SRC}$ and the torque $\tau_{LB}$ of the load).

According to the driving apparatus 10, the control system and the control method of the present embodiment, the torque $\tau_{LB}$ of the load on the motor section 14 can be obtained with high accuracy by the encoder section 12. Further, by correcting the driving amount of the motor section 14 using the torque $\tau_{LB}$ of the load, even when the load fluctuates greatly, the motor section 14 can be made to have a large output and the rotation angle of the second rotation shaft 18B (output shaft) can be controlled to the target value with high accuracy.

Further, in order to detect the rotation angle of the second rotation shaft 18B (driven section 50) with high accuracy by the encoder section 12 in the driving apparatus 10, it is desirable that there is high rigidity between the base member 30A and the motor section 14 and that the change in the rotation angle of the motor section 14 is small. On the other hand, in order to detect the torque of the load on the motor section 14 with high accuracy, it is desirable to reduce the rigidity between the base member 30A and the motor section 14 so that the base member 30A and the motor section 14 can rotate relative to each other to some extent. In the present embodiment, the actual rigidity between the base member 30A and the motor section 14 is reduced because the motor section 14 is connected to the base member 30A via the elastic member 32. Also, in order to suppress the decrease in the detection accuracy of the rotation angle of the second rotation shaft 18B by the encoder section 12 due to the decrease in the rigidity between the base member 30A and the motor section 14, the rotation angle $\theta_B$ of the motor section 14 relative to the base member 30A is detected by the third detection section 33C, and the rotation angle $\theta_B$ is used to obtain the torque $\tau_{LB}$ of the load on the motor section 14. Therefore, by correcting the rotation angle of the second rotation shaft 18B obtained from the detection results of the first detection section 33A and the second detection section 33B using the torque $\tau_{LB}$ of the load or by correcting the driving amount of the motor section 14 according to the torque $\tau_{LB}$ of the load, the rotation angle of the second rotation shaft 18B can be detected with high accuracy or the rotation angle of the second rotation shaft 18B can be controlled to the target rotation angle with high accuracy.

Note that in the embodiments described above, reflective or transmissive optical detectors are used as the detection sections 33A to 33C. Alternatively, a detector of a magnetic type, an electrostatic capacitive type or the like may be used as the detection section. Furthermore, although the detection sections 33A to 33C have rotation plates 34A to 34C, the ends 18Aa and 18Ba of the rotation shafts 18A and 18B and the holding member 30E or the like of the motor case 30D may be used as rotation plates. That is, a magnetization pattern or a reflection pattern or the like, indicating the position in the rotational direction may be formed on the surfaces of the ends 18Aa and 18Ba and the holding member 30E, and the rotation information may be detected by a detection section including a magnetic sensor or a light receiving element and so on. Further, in addition to the configuration shown in FIG. 2(A), the elastic member 32 can use an elastic member of any shape, such as a spring wound around a straight line passing through the central axis of the first rotation shaft 18A, for example, or an elastic member of a polymeric material having elasticity, such as rubber.

Figure 10:
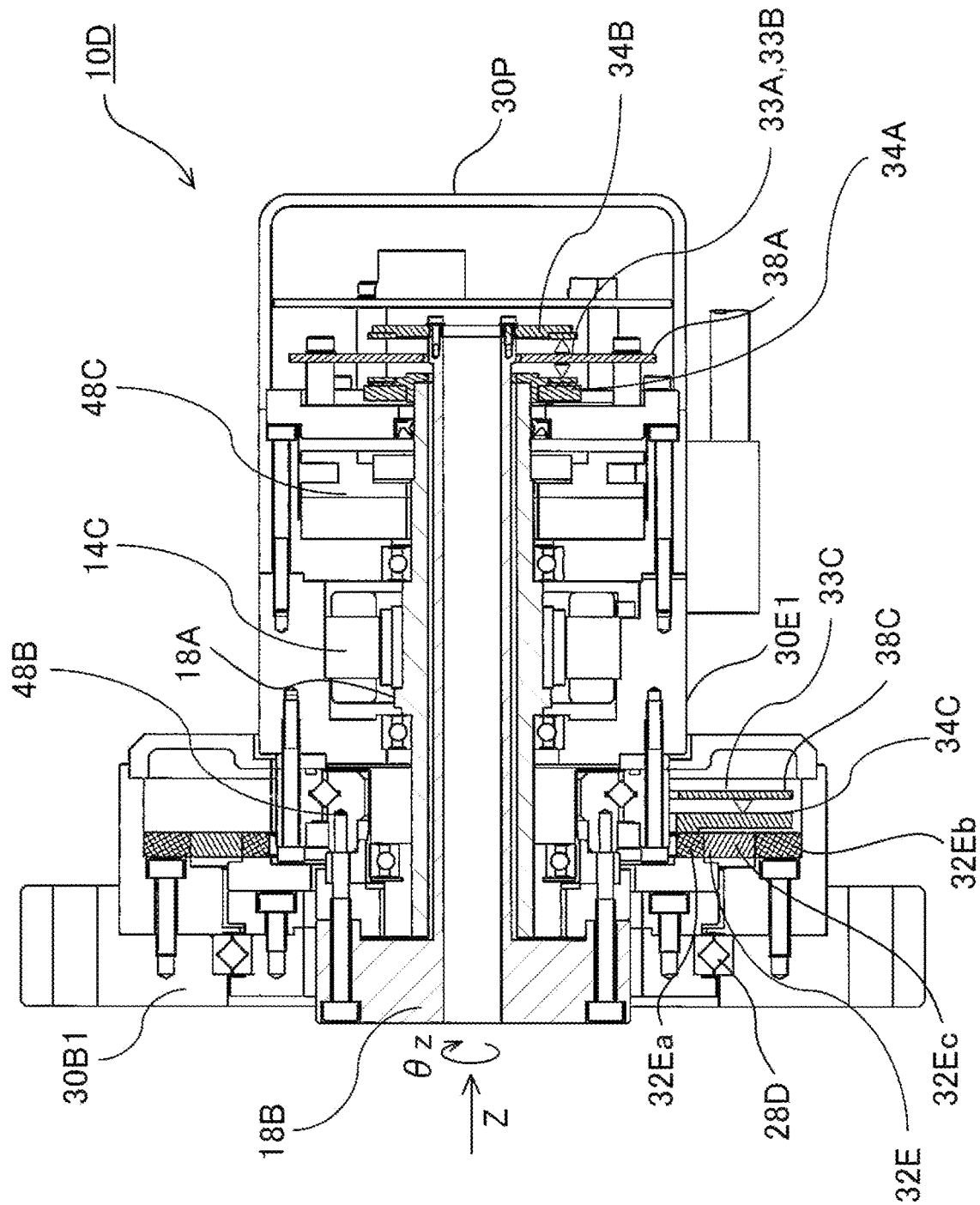
FIG. 10 illustrates a cross sectional view showing a variation of the first embodiment.
Figure 11:
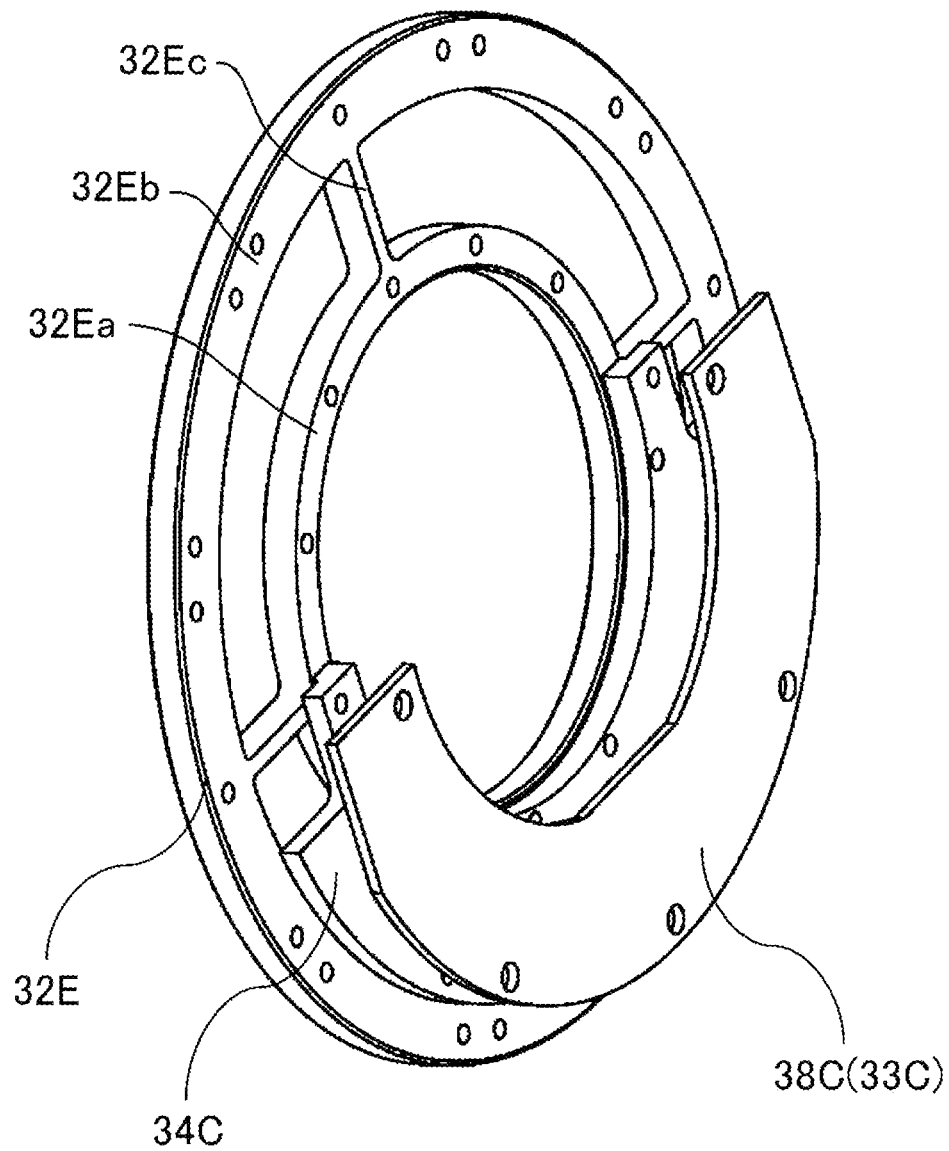
FIG. 11 illustrates a perspective view showing the elastic member in FIG. 10.

Next, a variation of the above-mentioned embodiment is described with reference to FIG. 10 and FIG. 11. In FIG. 10 and FIG. 11, the members corresponding to FIG. 1 and FIG. 2 are marked with the same or similar signs and their detailed explanations are omitted. FIG. 10 illustrates the driving apparatus 10D of the variation, and FIG. 11 illustrates the elastic member 32E in FIG. 10. In FIG. 10, the driving apparatus 10D includes a base member (fixed section) 30B1 fixed via an unshown support member (for example, an arm or the like) on the floor surface of a factory (not illustrated) where, for example, a robot apparatus is provided, a second rotation shaft 18B (an output shaft or a second moving shaft) rotatably supported onto the base member 30B1 via a rotation bearing 28D, a first rotation shaft 18A (a first moving shaft) connected to the second rotation shaft 18B via a speed reducer 48B, the motor section 14C that is supported by the holding member 30E1 connected to the base member 30B1 and rotates and drives the first rotation shaft 18A, an elastic member (elastic body) 32E for connecting the motor section 14C (the holding member 30E1) to the base member 30B1 in a displaceable manner, a brake 48C for stopping the rotation of the first rotation shaft 18A, and an encoder section for detecting the rotation information such as the rotation angle and rotation speed of the rotation shafts 18A and 18B and the above-mentioned load applied to the motor section 14C.

Also, the first rotation shaft 18A is rotatably supported against the holding member 30E1, and the rotation shafts 18A and 18B are rotatable around their central axes (the axes parallel to the Z axis), respectively. As one example, although the motor section 14C is a three-phase AC motor, a DC motor or the like can also be used as the motor section 14C. The encoder section of the present variation also includes a first detection section 33A for obtaining the encoder information in the $\theta z$ direction of the first rotation plate 34A (the first rotation shaft 18A) relative to the motor section 14C, a second detection section 33B for obtaining the encoder information in the θz direction of the second rotation plate 34B (the second rotation shaft 18B) relative to the motor section 14C, and a third detection section 33C for obtaining the encoder information S1C in the θz direction of the third rotation plate 34C (and the motor section 14C) relative to the base member 30B1. The first rotation plate 34A is connected to the first rotation shaft 18A, and the second rotation plate 34B is connected to the second rotation shaft 18B. Also, the light source and the light receiving element of the first detection section 33A, and the light source and the light receiving element of the second detection section 33B are provided on the substrate 38A, which is connected to the holding member 30E1. Also, the side surface of the second rotation plate 34B (the surface in the +Z direction) is covered by a cover member 30P.

Further, the third rotation plate 34C is fixed on the elastic member 32E, and the light source and the light receiving element of the third detection section 33C are supported by the holding member 30E1 via the substrate 38C. Note that since the rotation range of the third rotation plate 34C is smaller than one rotation, a plate of approximately half a circle with a pattern formed to detect the position in the rotational direction may be used as the third rotation plate 34C. As shown in FIG. 11, the elastic member 32E includes an inner orbicular section (for example, a first element) 32Ea that is fixed to the holding member 30E1 in FIG. 10, an outer orbicular section (for example, a second element) 32Eb that is fixed to the base member 30B1 in FIG. 10, and a plurality of (for example, three, four, five and so on) sheet spring sections 32Ec (for example, a third element) that connect the inner and outer orbicular sections in the radial direction. The sheet spring section 32Ec can be elastically deformed within a predetermined range around a central axis (for example, an axis that coincides with the central axis of the rotation shafts 18A and 18B). Therefore, the elastic member 32E allows the motor section 14C inside the holding member 30E1 to rotate with respect to the base member 30B1 around its central axis (for example, the axis coinciding with the central axis of the rotation shafts 18A and 18B) or around the axis parallel to the Z axis in the +θz or −θz direction within a predetermined range in the rotational direction (the θz direction). Also, the third rotation plate 34C with a pattern is connected with the inner orbicular section 32Ea of the elastic member 32E. By increasing the rigidity of the sheet spring section 32Ec of the elastic member 32E, the range of the relative rotation angle of the motor section 14C relative to base member 30B1 in the θz direction can be reduced. The other configurations and so on are the same as those of the first embodiment.

According to the variation, similar to the above-mentioned embodiment, the torque $\tau_{LB}$ of the load on the motor section 14C can be obtained by the encoder section with high accuracy. Further, by correcting the driving amount of the motor section 14C using the torque $\tau_{LB}$ of the load, the motor section 14C can be made to have a large output even when the load fluctuates greatly, and the rotation angle of the second rotation shaft 18B (output shaft) can be controlled to the target value with high accuracy.

Figure 6:
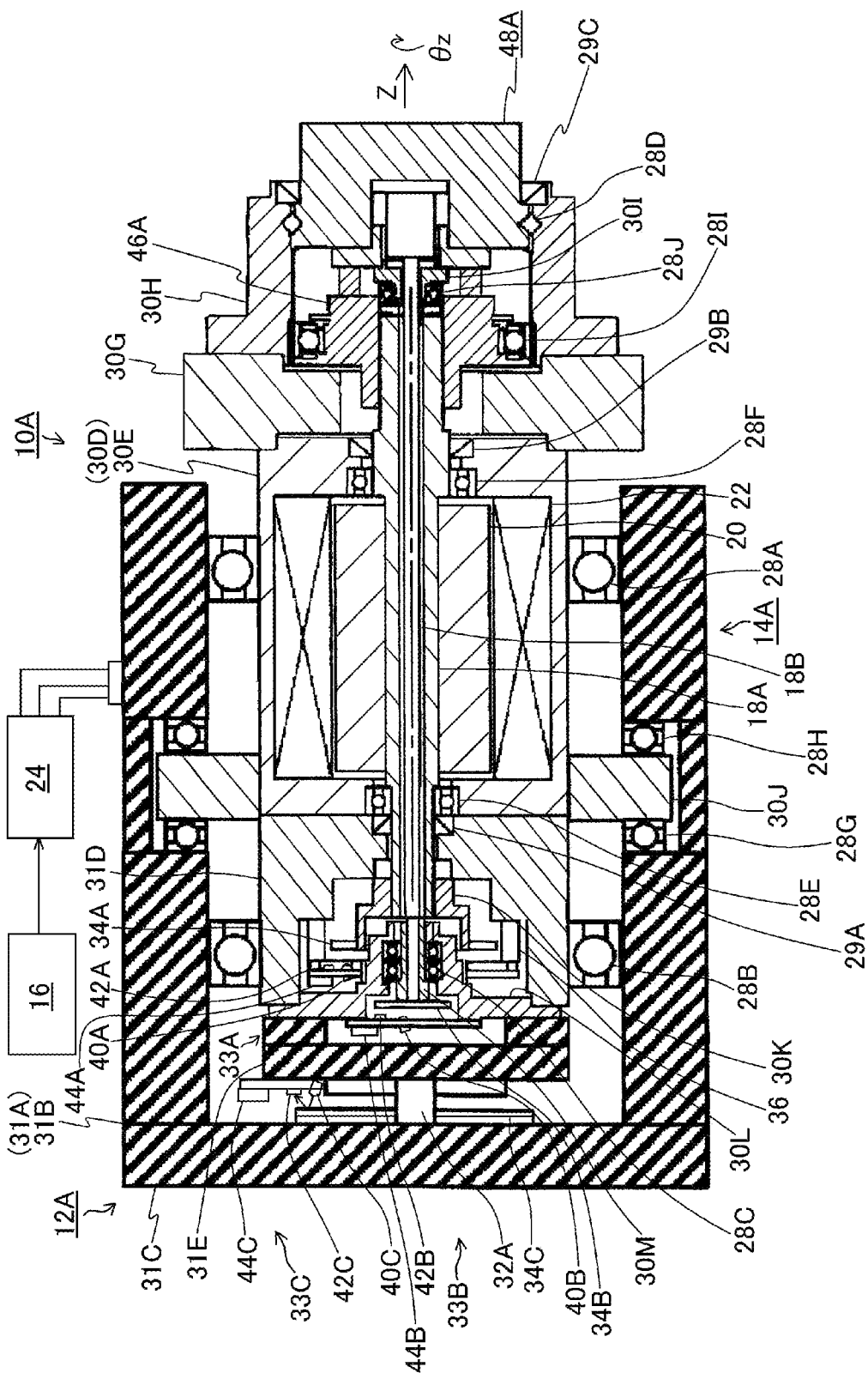
FIG. 6 illustrates a cross sectional view showing a driving apparatus according to a second embodiment.

Next, the second embodiment is explained with reference to FIG. 6. Note that in FIG. 6, the members corresponding to FIG. 1 are marked with the same signs and their detailed descriptions are omitted. FIG. 6 illustrates the driving apparatus 10A according to the present embodiment. In FIG. 6, the driving apparatus 10A includes a base member (fixed section) 31A fixed on the floor surface provided in a factory (not illustrated) where, for example, a driving apparatus 10A is provided, a motor section 14A for driving the first rotation shaft 18A, an elastic member 32A for connecting the motor section 14A displaceably to the base member 31A, a speed reducer 48A for slowing down the rotation of the first rotation shaft 18A and transmitting it to the second rotation shaft 18B, and a encoder section 12A for detecting the rotation information of the rotation shafts 18A and 18B and the load applied to the motor section 14A.

In the present embodiment, the Z axis is also taken parallel to the central axis of the first rotation shaft 18A for description. The base member 31A includes a cylindrical support member 31B and a retaining member 31C for covering the end in the −Z direction of the support member 31B. Also, the motor section 14A includes a holding member 30E (including the retaining member 30F in FIG. 1) in a cylindrical shape with two closed ends, a motor case 30D fixed on the end in the −Z direction of the holding member 30E, which has a cylindrical holding member 31D with a difference in level formed in the interior, a ring-shaped connecting member 30J provided to enclose the central portion of the motor case 30D, a coil 22 fixed on the inner surface of the motor case 30D, and a magnet 20 fixed on the outer surface of the first rotation shaft 18A. The first rotation shaft 18A is supported via thrust bearings 29A and 29B and rotation bearings 28E and 28F on both ends of the holding member 30E, respectively, and is rotatable around the axis of the central axis, which is parallel to the Z axis (θz direction).

Also, the motor case 30D of the motor section 14A is rotatably supported in the θz direction via the rotation bearings 28A and 28B on the inner surface of the support member 31B of the base member 31A. In addition, the connecting member 30 of the motor section 14A is supported in the recess on the inner surface of the support member 31B, sandwiched between two thrust bearings 28G and 28H, so that it can rotate in the θz direction and cannot move in the Z direction.

Also, a disc-shaped connecting member 31E is fixed to the end in the −Z direction of the holding member 31D via a cylindrical connecting member 30L, and the surface in the +Z direction of the retaining member 31C and the surface in the −Z direction of the connecting member 31E are connected by an elastic member 32A consisting of a spring wound in the θz direction, for example. The elastic member 32A supports the motor section 14A (connecting member 31E) to be rotatable in the +θz direction or the -θz direction within a predetermined range with respect to the base member 31A. By increasing the rigidity of the elastic member 32A, the range of relative rotation angle in the θz direction of the motor section 14A relative to the base member 31A can be reduced.

Further, the cylindrical support member 30G is fixed to the side surface of the motor case 30D in the +Z direction, and the input shaft 46A of the speed reducer 48A connected to the end of the first rotation shaft 18A in the +Z direction is rotatably supported via the rotation bearing 28I on the inner surface of the mounted member 30H fixed to the surface of the support member 30G in the +Z direction. Furthermore, a speed reducer 48A is rotatably supported on the side portion in the +Z direction of the inner surface of the mounted member 30H via the rotation bearing 28D and the thrust bearing 29C, and the end in the +Z direction of the second rotation shaft 18B is connected to the output shaft of the speed reducer 48A. The driven section (not illustrated) is connected to the surface in the +Z direction of the speed reducer 48A (the end in the +Z direction of the second rotation shaft 18B).

Furthermore, the end of the second rotation shaft 18B in the +Z direction is rotatably supported in the θz direction on the inner surface of the input shaft 46A via the fixing member 30I and the rotation bearing 28J. Also, the end of the second rotation shaft 18B in the −Z direction is rotatably supported in the θz direction on the inner surface of the connecting member 30L via the fixing member 30M and the rotation bearing 28C. Also, the orbicular and disc-shaped first and second rotation plates 34A and 34B with a rotational type detection pattern reflectively formed thereon, respectively, are mounted onto the support member 30K fixed to the end of the first rotation shaft 18A in the −Z direction and to the end of the second rotation shaft 18B in the −Z direction. Furthermore, an orbicular third rotation plate 34C with a rotational type detection pattern reflectively formed thereon is mounted to the surface in the +Z direction of the connecting member 31E of the base member 31A.

The encoder section 12A of the present embodiment includes a first detection section 33A, including the first rotation plate 34A, the light source 40A that irradiates the detection light to the pattern of the first rotation plate 34A, the light receiving element 42A for receiving the light (for example, reflected light) from the pattern, and a processing circuit 44A for processing the detection signal of the light receiving element 42A and obtaining the encoder information S1A in the θz direction of the rotation plate 34A (and the first rotation shaft 18A) with respect to the motor section 14, and a second detection section 33B, including the second rotation plate 34B, the light source 40B for irradiating the detection light to the pattern of the second rotation plate 34B, a light receiving element 42B for receiving light (for example, reflected light) from the pattern, and a processing circuit 44B for processing the detection signal of the light receiving element 42B to obtain the encoder information S1B in the θz direction of the rotation plate 34B (and the second rotation shaft 18B) with respect to the motor section 14A.

Also, the encoder section 12A includes a third detection section 33C, including a third rotation plate 34C, a light source 40C for irradiating detection light to a pattern on the third rotation plate 34C, a light receiving element 42C for receiving light (for example, reflected light) from the pattern, and a processing circuit 44C for processing the detection signal of the light receiving element 42C to obtain encoder information S1C in the θz direction of the rotation plate 34C (and motor section 14A) with respect to the base member 31A. The light source 40A, the light receiving element 42A, and the processing circuit 44A are supported by the holding member 31D, and the light source 40B, the light receiving element 42B, and the processing circuit 44B are supported by the connecting member 30L. The light source 40C, the light receiving element 42C and the processing circuit 44C are supported by the connecting member 31E. The other configurations are the same as those in the first embodiment.

In other words, the encoder information S1A, SIB, and S1C of the detection sections 33A to 33C are supplied to the computing apparatus 16, which uses the encoder information S1A and S1B to obtain information of the actual rotation angle of the second rotation shaft 18B, and uses the encoder information S1C to obtain information of the torque of the load applied from the base member 31A to the motor section 14A (further the load applied from the driven section to the motor section 14A), obtains the information of the correction value of the driving amount of the motor section 14A from the information of the torque, and supplies the obtained information to the control apparatus 24. The control apparatus 24 uses the information supplied from the computing apparatus 16 to drive the motor section 14A.

In the present embodiment, the encoder section 12A can also obtain the load (torque) on the motor section 14A using the detection signal of a third detection section 33C, and the third detection section 33C is mounted at a position away from the speed reducer 48A and the second rotation shaft 18B (the driven section). Therefore, even if there are variations in the rotation angle of the second rotation shaft 18B (the output shaft) and friction or the like caused by grease on the second rotation shaft 18B, the load on the motor section 14A can be detected with high accuracy using a simple configuration. Then, the driving apparatus 10 can control the rotation angle of the second rotation shaft 18B using the detection result with high accuracy.

Figure 7:
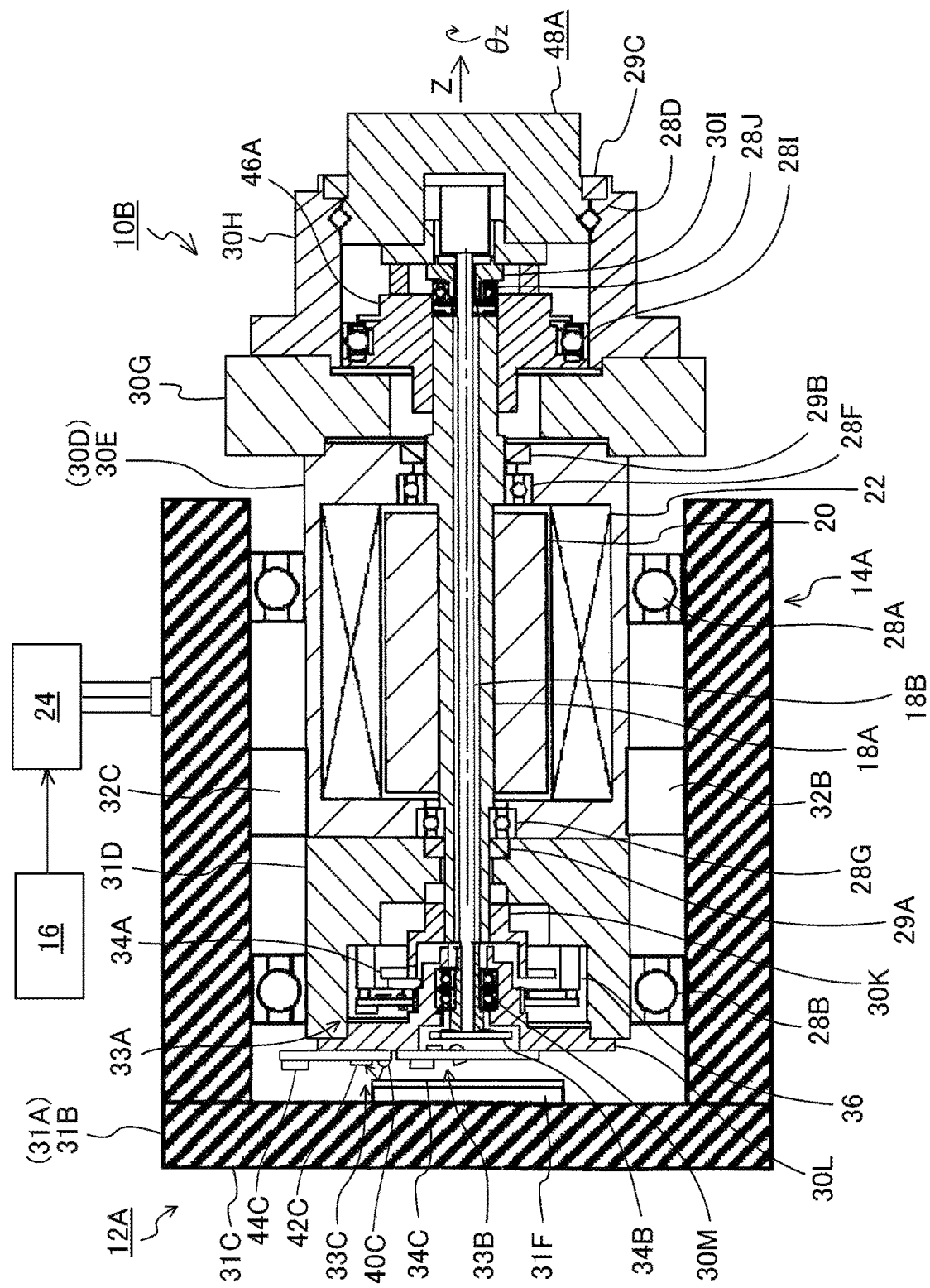
FIG. 7 illustrates a cross sectional view showing a driving apparatus according to a third embodiment.

Then, the third embodiment is described with reference to FIG. 7. Note that in FIG. 7, the members corresponding to FIG. 6 are marked with the same signs and their detailed descriptions are omitted. FIG. 7 illustrates the driving apparatus 10B according to the present embodiment. In FIG. 7, the motor case 30D of the motor section 14A is rotatably supported in the θz direction via the rotation bearings 28A and 28B on the inner surface of the cylindrical support member 31B of the base member 31A of the driving apparatus 10B. Furthermore, the motor case 30D of the motor section 14A is supported by a plurality of (for example, four) sheet springs 32B and 32C (the other, for example, two sheet springs are not illustrated) at the center position of the rotation bearings 28A and 28B on the inner surface of the support member 31B. The sheet springs 32B and 32C are arranged on the inner surface side of the support member 31B on the side surface (peripheral surface) side of the motor case 30D. Also, in FIG. 7, the sheet springs 32B and 32C are fixed to be in contact with the side surface of the motor case 30D and the inner surface of the support member 31B. The sheet springs 32C and 32D (elastic bodies) support the motor section 14A (the motor case 30D) against the base member 31A rotatably in the +θz direction or the −θz direction within a predetermined range. By increasing the rigidity of the sheet springs 32C and 32D, the range of the relative rotation angle in the θz direction of the motor section 14A relative to the base member 31A can be reduced.

Also, a disk-shaped third rotation plate 34C on which a rotational type detection pattern is reflectively formed is mounted to the center portion of the surface in the +Z direction of the retaining member 31C of the base member 31A via a flat support member 31F. Furthermore, a light source 40C that irradiates detection light to the pattern on the third rotation plate 34C, a light receiving element 42C that receives light (for example, reflected light) from the pattern, and a processing circuit 44C that processes the detection signal are supported by a connecting member 30L connected to the motor case 30D (motor section 14A). The encoder section 12A of the present embodiment includes a third rotation plate 34C, a light source 40C, a light receiving element 42C, and a processing circuit 44C, and has a third detection section 33C for obtaining the encoder information S1C in the θz direction of the motor section 14A relative to the base member 31A (the rotation plate 34C). The other configurations are the same as those in the second embodiment, and the encoder section 12A also has the first detection section 33A and the second detection section 33B. In the present embodiment, the encoder section 12A can also obtain the load (torque) on the motor section 14A using the detection signal of a third detection section 33C, and the third detection section 33C is mounted at a position away from the speed reducer 48A and the second rotation shaft 18B (the driven section). Therefore, the same effect can be obtained as the second embodiment.

Figure 8:
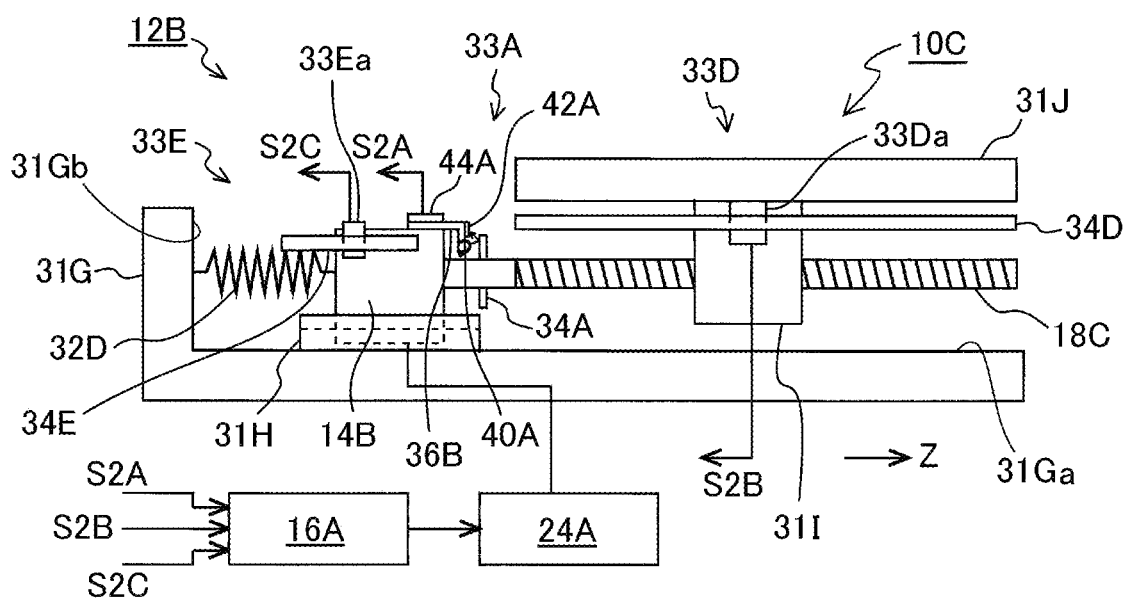
FIG. 8 illustrates a driving apparatus according to a fourth embodiment.

Next, the fourth embodiment is described with reference to FIG. 8. Note that in FIG. 8, the members corresponding to FIG. 1 are marked with the same signs and the detailed descriptions are omitted. FIG. 8 illustrates the driving apparatus 10C according to the present embodiment. In FIG. 8, the driving apparatus 10C includes a L shape base member 31G, a motor section 14B, a encoder section 12B, a computing apparatus 16A and a control apparatus 24A. The motor section 14B is mounted on the upper surface 31Ga of the base member 31G via a linear guide 31H, and the motor section 14B drives the rotation of a ball screw 18C that is arranged parallel to the upper surface 31Ga. Hereinafter, the Z axis parallel to the ball screw 18C is taken for the explanation. The movable section 311 is screwed to the ball screw 18C, the movable table 31J is fixed to the upper surface of the movable section 311, and the workpiece (not illustrated) is placed on the upper surface of the movable table 31J. By driving the rotation of the ball screw 18C with the motor section 14B, the movable table 31J moves in the Z direction via the movable section 311. The ball screw 18C is supported on the upper surface 31Ga via a rotation bearing (not illustrated), and the movable section 311 moves along the guide member (not illustrated).

Also, the rear surface 31Gb of the base member 31G and the surface in the –Z direction of the motor section 14B are connected by a spring-shaped elastic member 32D wound around an axis parallel to the Z axis. The motor section 14B is movable in the Z direction along the linear guide 31H, and the motor section 14B is connected to the base member 31G by an elastic member 32D to be displaceable in the Z direction. By increasing the rigidity of the elastic member 32D, the displacement range of the motor section 14B in the Z direction can be reduced.

Also, the encoder section 12B of the present embodiment includes a first detection section 33A, a second detection section 33D and a third detection section 33E. The first detection section 33A includes a rotation plate 34A provided on the ball screw 18C, a light source 40A, a light receiving element 42A, and a processing circuit 44A provided on the support member 36B of the motor section 14B, and generates encoder information S2A including the rotation angle around the axis parallel to the Z axis of the ball screw 18C (the first displacement section) relative to the motor section 14B. Also, the scale sections 34D and 34E, which have a grid pattern or the like formed parallel to the Z axis, are arranged on the upper surface 31Ga of the base member 31G via the unshown support members respectively. Next, the second detection section 33D includes a scale section 34D and a light-receiving and light-emitting element section 33Da that is provided in the movable section 311, which reads the pattern of the scale section 34D, and generates the encoder information S2B including the position of the movable table 31J (the second displacement section) in the Z direction relative to the motor section 14B. The third detection section 33E includes a scale section 34E and a light-receiving and light-emitting element section 33Ea that is provided in the motor section 14B, which reads the pattern of the scale section 34E, and generates the encoder information S2C including the position of the motor section 14B in the Z direction relative to the base member 31G. The detection sections 33D and 33E of the present embodiment are optical linear encoders. The generated encoder information S2A, S2B and S2C are supplied to the computing apparatus 16A.

The computing apparatus 16A obtains the position information of the movable table 31J in the Z direction using the encoder information S2A and S2B, obtains the information of the load applied from the base member 31G to the motor section 14B (the load applied further from the movable table 31J to the motor section 14B) using the encoder information S2C, obtains the information of the correction value of the driving amount of the motor section 14B from the information of the load, and supplies the obtained information to the control apparatus 24A. The control apparatus 24A drives the motor section 14B using the information supplied from the computing apparatus 16A.

In the present embodiment, the encoder section 12B can also obtain the load in the Z direction for the motor section 14B using the detection signal of a third detection section 33E, and the third detection section 33E is arranged at a position away from the ball screw 18C (the first displacement section) and the movable table 31J (the second displacement section). Therefore, even if there are variations in the position of the movable table 31J and friction or the like caused by grease between the movable table 31J and the guide member (not illustrated), the load on the motor section 14B can be detected with high accuracy using a simple configuration. Then, the position of the movable table 31J can be controlled with high accuracy using the detection result.

Figure 12:
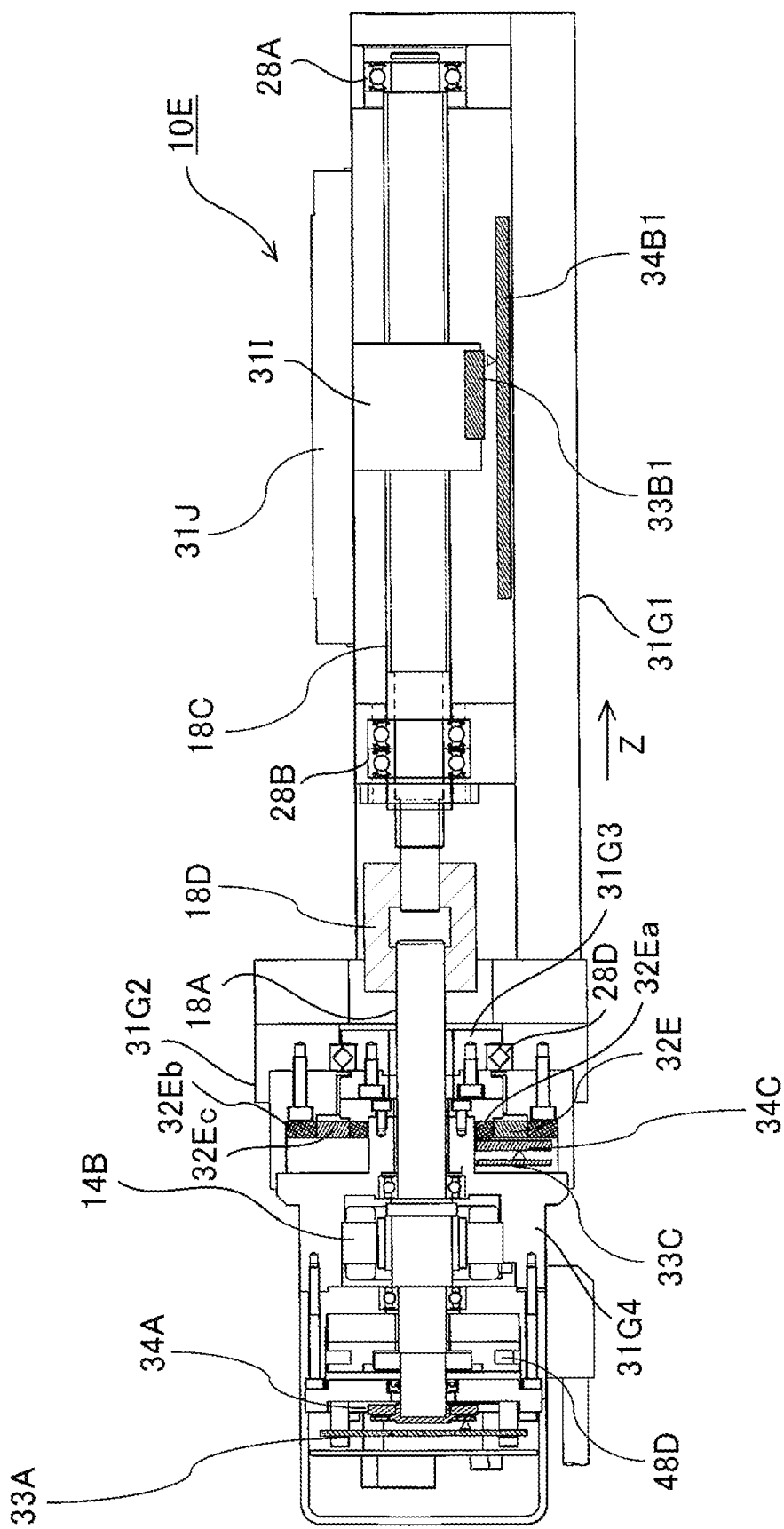
FIG. 12 illustrates a cross sectional view showing a variation of the fourth embodiment.

Note that in the present embodiment, any linear encoder, such as a magnetic type or a electrostatic capacity type, can be used as the detection sections 33D and 33E, in addition to optical reflective or transmissive type linear encoders. Then, the variation of the present embodiment is described with reference to FIG. 12. In FIG. 12, the members corresponding to FIG. 1, FIG. 8 and FIG. 11 are marked with the same or similar signs, and the detailed descriptions are omitted.

FIG. 12 illustrates the driving apparatus 10E of the variation. In FIG. 12, the driving apparatus 10E includes an L-shaped base member 31G1, a support member 31G2 fixed to the end of the base member 31G1, a connecting member 31G3 rotatably arranged on the end of the base member 31G1 via a rotation bearing 28D, a motor case 31G4 connected to the connecting member 31G3, a motor section 14B held inside the motor case 31G4, an encoder section, a first rotation shaft 18A (the first driving shaft) rotatably driven by the motor section 14B, a brake 48D for stopping the rotation of the first rotation shaft 18A, and an elastic member (the elastic body) 32E that displaceably connects the motor section 14B (the motor case 31G4) to the base member 31G1 (the support member 31G2), and a ball screw 18C that is connected to the first rotation shaft 18A by a coupling 18D. The ball screw 18C (the second driving shaft) is supported parallel to the Z axis by a pair of rotation bearings 28A and 28B on the upper surface of the base member 31G1, and the movable table 31J (the linear stage) is fixed to the upper surface of the movable section 311, which is screwed to the ball screw 18C.

Further, the encoder section of the present variation includes a first detection section 33A for obtaining the encoder information in the direction of rotation around the Z axis (θz direction) of the first rotation plate 34A (the first rotation shaft 18A) relative to the motor section 14B, a second detection section 33B1 consisting of a linear encoder to obtain the encoder information including the position and/or speed in the Z direction of the ball screw 18C relative to the motor section 14B, and a third detection section 33C for obtaining the encoder information in the θz direction of the third rotation plate 34C (and the motor section 14B)

relative to the base member 31G1. The first rotation plate 34A is connected to the first rotation shaft 18A, the scale section 34B1 of the second detection section 33B1 is fixed to the upper surface of the base member 31G1, and the light source and light receiving element of the second detection section 33B1 are fixed to the bottom surface of the movable section 311 so as to face the scale section 34B1. Also, the light source and light receiving element of the first detection section 33A are fixed to a substrate connected to the motor case 31G4, and the light source and light receiving element of the third detection section 33C are fixed to a substrate connected to the motor case 31G4.

Further, the third rotation plate 34C is fixed to the elastic member 32E. By means of the elastic member 32E, the motor section 14B in the motor case 31G4 is rotatable with respect to the base member 31G1 (the support member 31G2) around its central axis (for example, the axis coinciding with the central axis of the rotation shaft 18A) or in the rotational direction (θz direction) around the axis parallel to the Z axis in a predetermined range in the +θz direction or the −θz direction. Also, the outer orbicular section 32Eb of the elastic member 32E is connected to the support member 31G2 (the base member 31G1), the inner orbicular section 32Ea of the elastic member 32E is connected to the motor case 31G4, and the third rotation plate 34C is connected to the outer orbicular section 32Eb of the elastic member 32E. By increasing the rigidity of the sheet spring section 32Ec of the elastic member 32E, the range of relative rotation angle in the θz direction of the motor section 14B relative to the base member 31G1 can be reduced. The other configurations or the like are the same as those in the first and fourth embodiments.

According to this variation, the torque $\tau_{LB}$ of the load on the motor section 14B can be obtained with high accuracy by the encoder section similar to the embodiment mentioned above. Furthermore, by using the torque $\tau_{LB}$ of the load to correct the driving amount of the motor section 14B, the motor section 14B can be made to have a large output even when the load fluctuates greatly, and the rotation angle of the ball screw 18C (the output shaft) can be controlled to the target value with high accuracy.

Figure 9:
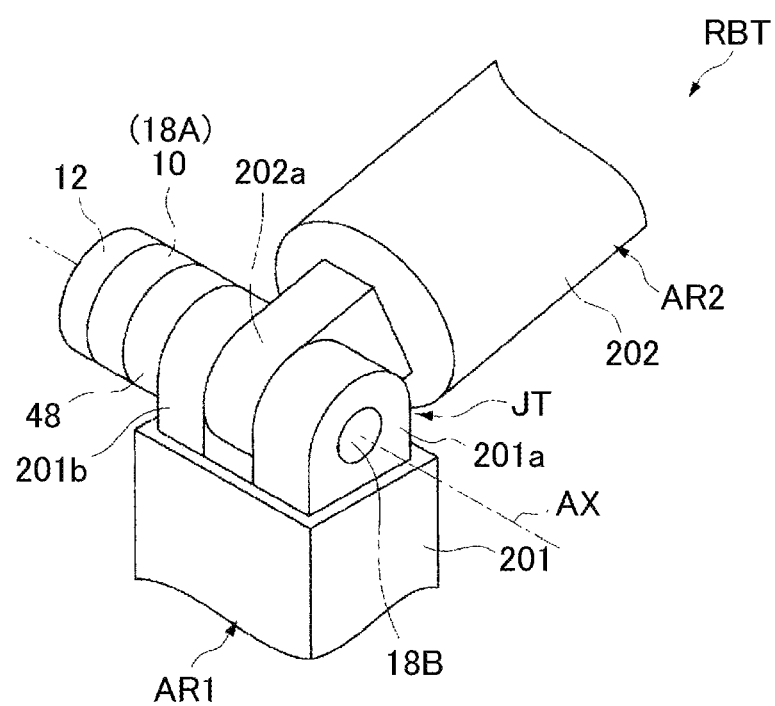
FIG. 9 illustrates a perspective view showing one example of a robot apparatus.

Also, the driving apparatuses of each of the above-mentioned embodiments can be used as a driving system for various working machines or robot apparatuses respectively. FIG. 9 illustrates a perspective view showing the robot apparatus RBT used by the driving apparatus 10 of the above-mentioned embodiment. Note that in FIG. 9, a part of the robot apparatus RBT (the joint portion) has been schematically illustrated. In descriptions below, the constitutional parts that are the same as or equivalent to the above embodiments are marked with the same signs for omitting or simplifying the descriptions. The robot apparatus RBT includes a first arm AR1, a second arm AR2, and a joint section JT. The first arm AR1 is connected to the second arm AR2 via the joint section JT.

The first arm AR1 includes an arm portion 201, an axis bearing 201a and an axis bearing 201b. The second arm AR2 includes an arm portion 202 and a connect section 202a. The connect section 202a is arranged between the axis bearing 201a and the axis bearing 201b in the joint section JT. The connect section 202a is provided integrally with the second rotation shaft 18B. The rotation shaft 18B is inserted in both of the axis bearing 201a and the axis bearing 201b in the joint section JT. The end of the side inserted in the axis bearing 201b of the rotation shaft 18B is connected to the speed reducer 48 passing through the axis bearing 201b.

The speed reducer 48 is connected to the driving apparatus 10 and transmits the rotation of the first rotation shaft 18A (not illustrated in FIG. 9) of the driving apparatus 10 to the rotation shaft 18B by slowing down it, for example, to 1/100th or the like of the magnitude. Although not illustrated in FIG. 9, the end of the rotation shaft 18A of the driving apparatus 10 is connected to the speed reducer 48. Also, a scale similar to the rotation plate 34A of the encoder section 12 (refer to FIG. 1) is mounted to the end of the rotation shaft 18A of the driving apparatus 10.

In the robot apparatus RBT, when the driving apparatus 10 is driven to rotate the rotation shaft 18A, this rotation is transmitted to the rotation shaft 18B via the speed reducer 48. The rotation of the rotation shaft 18B causes the connect section 202a to rotate integrally, which in turn causes the second arm AR2 to rotate with respect to the first arm AR1. In this case, the encoder section 12 detects the angular position or the like of the rotation shaft 18A. Accordingly, by the output from the encoder section 12, the angular position of the second arm AR2 can be detected. In this robot apparatus RBT, since the encoder section 12 can detect the load (torque), the angular position and so on of the second arm AR2 can be controlled with high accuracy using the detected load. Note that the robot apparatus RBT is not limited to the above configuration, and the driving apparatus 10 can be applied to various robot apparatuses equipped with joints (for example, an assembly robot, a human cooperative robot, and so on).

What is claimed is:

1. An encoder comprising:
    a scale section attached to one of a fixed section and a motor case of a motor section which rotates a rotating shaft, the scale section having a pattern;
    a detection section attached to an other one of the fixed section and the motor case and configured to generate a detection signal based on the pattern of the scale section; and
    a computing section configured to compute information of load applied from the fixed section to the motor section based on the detection signal.

2. The encoder according to claim 1, wherein the computing section is configured to obtain a correction value of a driving amount of the motor section using the information of the load.

3. The encoder according to claim 2, wherein
    the rotating shaft is connected to a speed reducer as an input shaft, and
    the speed reducer is configured to convert a displacement of the input shaft and transmit the displacement of the input shaft that has been converted to an output shaft.

4. The encoder according to claim 3, wherein the computing section is configured to obtain a correction value of the driving amount so as to suppress a displacement of the output shaft by a change of the load.

5. The encoder according to claim 4, further comprising:
    a first detecting section configured to detect rotation information of the input shaft, wherein
    the computing section is configured to compute the driving amount based on the rotation information detected by the first detecting section.

6. The encoder according to claim 4, further comprising:
    a second detecting section configured to detect rotation information of the output shaft, wherein
    the computing section is configured to compute the driving amount based on the rotation information detected by the second detecting section.

7. The encoder according to claim 5, further comprising:
a second detecting section configured to detect rotation information of the output shaft, wherein
the computing section is configured to compute the driving amount based on the rotation information detected by the first detecting section and the rotation information detected by the second detecting section.

8. The encoder according to claim 1, wherein the load is a torque.

9. The encoder according to claim 1, further comprising:
an elastic body configured to connect the motor case and the fixed section to each other so that the motor case is rotatable with respect to the fixed section.

10. The encoder according to claim 9, wherein the elastic body has elasticity around an axis parallel to the rotating shaft.

11. The encoder according to claim 9, wherein the elastic body is a flexure, a wound spring, an elastic member, or an elastic member of a polymeric material.

12. The encoder according to claim 1, wherein the detection section is configured to measure a rotation angle of the motor section relative to the fixed section.

13. The encoder according to claim 1, wherein the detection section is a rotary encoder or a linear encoder.

14. The encoder according to claim 1, wherein the scale section is reflective or transmissive.

15. The encoder according to claim 1, wherein a type of the detection section is an optical type, a magnetic type or an electrostatic capacitive type.

16. A driving apparatus comprising:
a motor section configured to rotate an input shaft and having a motor case; and
an encoder, wherein
the encoder comprises:
a scale section attached to one of a fixed section and the motor case, the scale section having a pattern;
a detection section attached to an other one of the fixed section and the motor case and configured to generate a detection signal based on the pattern of the scale section; and
a computing section configured to compute information of load applied from the fixed section to the motor section based on the detection signal.

17. The driving apparatus according to claim 16, further comprising a speed reducer configured to convert a displacement of the input shaft and transmit the displacement of the input shaft that has been converted to an output shaft.

18. The driving apparatus according to claim 16, further comprising an elastic body configured to connect the motor case and the fixed section to each other so that the motor case is rotatable with respect to the fixed section.

19. The driving apparatus according to claim 16, wherein the computing section is configured to obtain a correction value of a driving amount of the motor section using the information of the load.

20. The driving apparatus according to claim 19, wherein the rotating shaft is connected to an input shaft of a speed reducer, and
the speed reducer is configured to convert a displacement of the input shaft and transmit the displacement of the input shaft that has been converted to an output shaft.

21. The driving apparatus according to claim 20, wherein the computing section is configured to obtain a correction value of the driving amount so as to suppress a displacement of the output shaft by a change of the load.

22. The driving apparatus according to claim 20, further comprising:
a first detecting section configured to detect rotation information of the input shaft, wherein
the computing section is configured to compute the driving amount based on the rotation information detected by the first detecting section.

23. The driving apparatus according to claim 20, further comprising:
a second detecting section configured to detect rotation information of the output shaft, wherein
the computing section is configured to compute the driving amount based on the rotation information detected by the second detecting section.

24. The driving apparatus according to claim 22, further comprising:
a second detecting section configured to detect rotation information of the output shaft, wherein
the computing section is configured to compute the driving amount based on the rotation information detected by the first detecting section and the rotation information detected by the second detecting section.

25. A robot apparatus comprising the driving apparatus according to claim 16.

26. A control system comprising:
a scale section attached to one of a fixed section and a motor case of a motor section which rotates a rotating shaft, the scale section having a pattern;
a detection section attached to an other one of the fixed section and the motor case and configured to generate a detection signal based on the pattern of the scale section; and
a computing section configured to compute information of load applied from the fixed section to the motor section based on the detection signal.

27. The control system according to claim 26, further comprising:
an elastic body configured to connect the motor case and the fixed section to each other so that the motor case is rotatable with respect to the fixed section.

28. The control system according to claim 26, wherein the computing section is configured to obtain a correction value of a driving amount of the motor section using the information of the load.

* * * * *